(12) United States Patent
Grisenthwaite

(10) Patent No.: US 12,461,861 B2
(45) Date of Patent: Nov. 4, 2025

(54) TWO-STAGE ADDRESS TRANSLATION

(71) Applicant: Arm Limited, Cambridge (GB)

(72) Inventor: Richard Roy Grisenthwaite, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/711,242

(22) PCT Filed: Apr. 28, 2022

(86) PCT No.: PCT/GB2022/051073
§ 371 (c)(1),
(2) Date: May 17, 2024

(87) PCT Pub. No.: WO2023/099860
PCT Pub. Date: Jun. 8, 2023

(65) Prior Publication Data
US 2025/0021487 A1     Jan. 16, 2025

(30) Foreign Application Priority Data

Nov. 30, 2021 (GB) ...................... 2117274

(51) Int. Cl.
*G06F 12/1009* (2016.01)
*G06F 9/455* (2018.01)
*G06F 12/14* (2006.01)

(52) U.S. Cl.
CPC ...... *G06F 12/1009* (2013.01); *G06F 9/45558* (2013.01); *G06F 12/1458* (2013.01);
(Continued)

(58) Field of Classification Search
CPC .............. G06F 12/1009; G06F 12/1491; G06F 12/1036; G06F 2212/1016;
(Continued)

(56) References Cited

U.S. PATENT DOCUMENTS

| | | |
|---|---|---|
| 2007/0016755 A1 | 1/2007 | Pratt |
| 2017/0286694 A1 | 10/2017 | Swidowski et al. |
| 2021/0110003 A1* | 4/2021 | Jain ..................... G06F 21/6245 |

OTHER PUBLICATIONS

International Search Report and Written Opinion for International Application No. PCT/GB2022/051073, dated Jul. 29, 2022.
(Continued)

*Primary Examiner* — Reginald G Bragdon
*Assistant Examiner* — Zakaria Mohammed Belkhayat
(74) *Attorney, Agent, or Firm* — NIXON & VANDERHYE P.C.

(57) ABSTRACT

Memory management circuitry (28) supports two-stage address translation based on a stage-1 and stage-2 translation table structures. Stage-2 access permission information specified by a stage-2 translation table entry has an encoding specifying whether a corresponding memory region has a partially-read-only permission indicating that write requests to the memory region corresponding to the target intermediate address, issued when processing circuitry (4) is in a predetermined execution state, are permitted for a restricted subset of write request types (including metadata-updating write requests for updating access tracking metadata in translation table entries) but prohibited for other write request types. The memory management circuitry (28) rejects a memory access request when the stage-2 access permission information of a corresponding stage-2 translation table entry specifies the partially-read-only permission and the memory access request is a write request, other than the restricted subset of write request types, issued in the predetermined execution state.

25 Claims, 18 Drawing Sheets

(52) U.S. Cl.
CPC .. *G06F 12/1491* (2013.01); *G06F 2212/1016* (2013.01); *G06F 2212/1052* (2013.01); *G06F 2212/651* (2013.01)

(58) Field of Classification Search
CPC ....... G06F 2212/1052; G06F 2212/657; G06F 12/145; G06F 2212/151; G06F 9/45558; G06F 2009/45583; G06F 2212/651; G06F 12/1441; G06F 12/1475; G06F 21/74; G06F 12/109; G06F 12/1458; G06F 12/1483; G06F 21/53
See application file for complete search history.

(56) References Cited

OTHER PUBLICATIONS

Shen et al., "TinyVisor: An extensible secure framework on android platforms," Computers & Security, vol. 72, Jul. 21, 2017, pp. 145-162.

\* cited by examiner

Write access control for memory regions marked by S2 permissions as partially-read-only, in response to different write request types:

| | Write request types permitted to write to partially-read-only region | Write request types prohibited from writing to partially-read-only region |
|---|---|---|
| | (optional) Write request issued in response to store instruction executed at EL2 or EL3 (including at least one type of store prohibited from writing to partially-read-only region if executed at EL0 or EL1) | Write request issued in response to at least one type of store instruction executed at EL0 or EL1 (e.g. majority of store instructions of the ISA) |
| restricted subset of write request types permitted to write to partially-read-ony region when write issued at EL1 | Predetermined type of translation table entry updating instruction executed at EL1, for example:<br>• protected-entry-checking type of RCW instruction executed at EL1, when protected-entry checks are passed. | |
| | Metadata-updating write request generated by MMU to update access tracking metadata in translation table entry (e.g. AF, write permission when DBM set) | |

FIG. 9

TWO-STAGE ADDRESS TRANSLATION

BACKGROUND

The present application relates to the field of data processing. More particularly, it relates to memory management.

BRIEF SUMMARY

A data processing apparatus can have memory management circuitry to perform address translation and control whether access to particular addresses is permitted, based on address mappings and access permission information defined in translation tables. The memory management circuitry can support two-stage address translation, where a translation from a virtual address to a physical address depends on a stage-1 mapping from the virtual address to an intermediate address and a stage-2 mapping from the intermediate address to a physical address. This can be useful to support virtualisation where multiple guest operating systems can co-exist on the same hardware platform, with the stage-1 mappings primarily controlled by a guest operating system and stage-2 mappings primarily controlled by a hypervisor, so that intermediate addresses (which from the guest operating system's point of view appear to refer to physical memory) can be remapped to different physical addresses. Two-stage address translation can be useful to avoid clashes between conflicting intermediate addresses set by different guest operating systems, and to map between the virtualised view of hardware resources seen by the guest operating system and the actual hardware resources provided in the processing apparatus.

At least some examples provide an apparatus comprising: processing circuitry to process instructions in one of a plurality of execution states associated with different levels of privilege; and memory management circuitry to translate a target virtual address specified by a memory access request into a target physical address indicative of a memory system location to be accessed in response to the memory access request; in which: the memory management circuitry is configured to support two-stage address translation based on a stage-1 translation table structure comprising stage-1 translation table entries and a stage-2 translation table structure comprising stage-2 translation table entries, where a mapping from the target virtual address to the target physical address depends on a stage-1 address mapping and a stage-2 address mapping, the stage-1 address mapping comprising a mapping from the target virtual address to a target intermediate address specified by a corresponding stage-1 translation table entry corresponding to the target virtual address, and the stage-2 address mapping comprising a mapping from the target intermediate address to the target physical address specified by a corresponding stage-2 translation table entry corresponding to the target intermediate address; the memory management circuitry is configured to perform permission checking for the memory access request based at least on stage-2 access permission information specified by the corresponding stage-2 translation table entry, the stage-2 access permission information having an encoding specifying whether a memory region corresponding to the target intermediate address has a partially-read-only permission indicating that write requests to the memory region corresponding to the target intermediate address, issued when the processing circuitry is in a predetermined execution state of the plurality of execution states, are permitted for a restricted subset of write request types but prohibited for write request types other than the restricted subset, the restricted subset of write request types comprising a metadata-updating write request generated by the memory management circuitry to update access tracking metadata in translation table entries; and the memory management circuitry is configured to reject the memory access request in response to determining that the memory access request is a write request issued in the predetermined execution state, the stage-2 access permission information specifies that the memory region corresponding to the target intermediate address has the partially-read-only permission, and the memory access request is a write request type other than the restricted subset of write request types.

At least some examples provide a method comprising: processing instructions in one of a plurality of execution states associated with different levels of privilege; and performing two-stage address translation of a target virtual address specified by a memory access request into a target physical address indicative of a memory system location to be accessed in response to the memory access request, the two-stage address translation based on a stage-1 translation table structure comprising stage-1 translation table entries and a stage-2 translation table structure comprising stage-2 translation table entries, where a mapping from the target virtual address to the target physical address depends on a stage-1 address mapping and a stage-2 address mapping, the stage-1 address mapping comprising a mapping from the target virtual address to a target intermediate address specified by a corresponding stage-1 translation table entry corresponding to the target virtual address, and the stage-2 address mapping comprising a mapping from the target intermediate address to the target physical address specified by a corresponding stage-2 translation table entry corresponding to the target intermediate address; performing permission checking for the memory access request based at least on stage-2 access permission information specified by the corresponding stage-2 translation table entry, the stage-2 access permission information having an encoding specifying whether a memory region corresponding to the target intermediate address has a partially-read-only permission indicating that write requests to the memory region corresponding to the target intermediate address, issued when the processing circuitry is in a predetermined execution state of the plurality of execution states, are permitted for a restricted subset of write request types but prohibited for write request types other than the restricted subset, the restricted subset of write request types comprising a metadata-updating write request generated by memory management circuitry to update access tracking metadata in translation table entries; and rejecting the memory access request in response to determining that the memory access request is a write request issued in the predetermined execution state, the stage-2 access permission information specifies that the memory region corresponding to the target intermediate address has the partially-read-only permission, and the memory access request is a write request type other than the restricted subset of write request types.

At least some examples provide a computer program comprising instructions for controlling a host data processing apparatus to provide an instruction execution environment for executing target code, the computer program comprising: processing program logic to simulate processing of instructions of the target code in one of a plurality of execution states associated with different levels of privilege; and memory management program logic to translate a target virtual address specified by a simulated memory access request triggered by the target code into a target physical address indicative of a simulated memory system location to be accessed in response to the memory access request; in which: the memory management program logic is configured to support two-stage address translation based on a stage-1 translation table structure comprising stage-1 translation table entries and a stage-2 translation table structure comprising stage-2 translation table entries, where a mapping from the target virtual address to the target physical address depends on a stage-1 address mapping and a stage-2 address mapping, the stage-1 address mapping comprising a mapping from the target virtual address to a target intermediate address specified by a corresponding stage-1 translation table entry corresponding to the target virtual address, and the stage-2 address mapping comprising a mapping from the target intermediate address to the target physical address specified by a corresponding stage-2 translation table entry corresponding to the target intermediate address; the memory management program logic is configured to perform permission checking for the simulated memory access request based at least on stage-2 access permission information specified by the corresponding stage-2 translation table entry, the stage-2 access permission information having an encoding specifying whether a memory region corresponding to the target intermediate address has a partially-read-only permission indicating that write requests to the memory region corresponding to the target intermediate address, issued when the processing program logic is in a predetermined execution state of the plurality of execution states, are permitted for a restricted subset of write request types but prohibited for write request types other than the restricted subset, the restricted subset of write request types comprising a metadata-updating write request generated by the memory management program logic to update access tracking metadata in translation table entries; and the memory management program logic is configured to reject the simulated memory access request in response to determining that the simulated memory access request is a write request issued in the predetermined execution state, the stage-2 access permission information specifies that the memory region corresponding to the target intermediate address has the partially-read-only permission, and the simulated memory access request is a write request type other than the restricted subset of write request types.

The computer program can be stored on a computer-readable storage medium. The recording medium may be a non-transitory storage medium.

BRIEF DESCRIPTION OF DRAWINGS

Further aspects, features and advantages of the present technique will be apparent from the following description of examples, which is to be read in conjunction with the accompanying drawings, in which:

FIG. 9 illustrates types of write request permitted and prohibited from writing to a partially-read-only memory region defined by a stage-2 translation table entry;

DETAILED DESCRIPTION

Partially-Read-Only Stage-2 Access Permission

Figure 1:
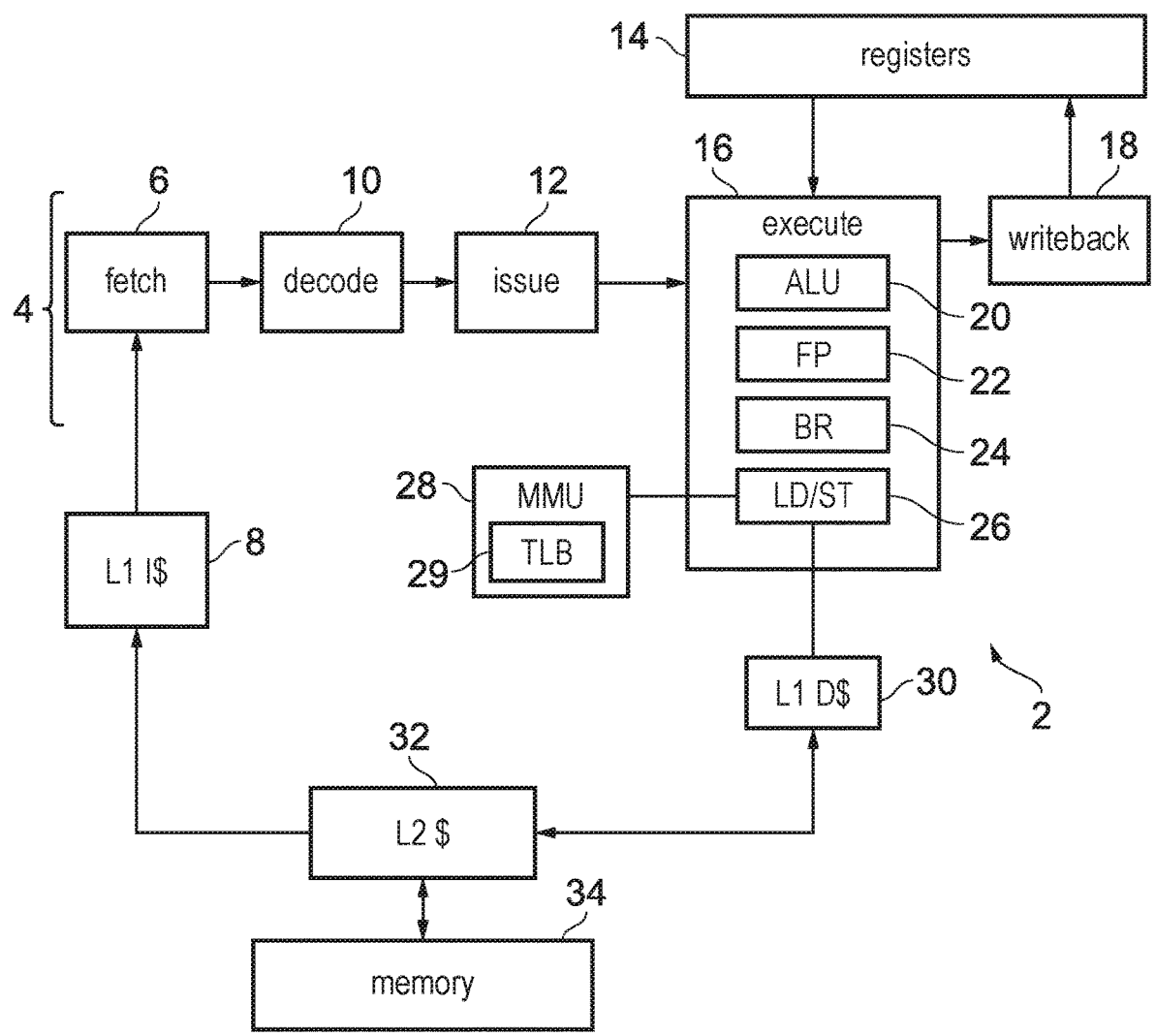
FIG. 1 illustrates an example of a data processing apparatus having processing circuitry and memory management circuitry.

An apparatus has processing circuitry to process instructions in one of a plurality of execution states associated with different levels of privilege, and memory management circuitry to translate a target virtual address specified by a memory access request into a target physical address indicative of a memory system location to be accessed in response to the memory access request. The memory management circuitry supports two-stage address translation based on a stage-1 translation table structure comprising stage-1 translation table entries and a stage-2 translation table structure comprising stage-2 translation table entries, where a mapping from the target virtual address to the target physical address depends on a stage-1 address mapping and a stage-2 address mapping. The stage-1 address mapping comprises a mapping from the target virtual address to a target intermediate address specified by a corresponding stage-1 translation table entry corresponding to the target virtual address. The stage-2 address mapping comprises a mapping from the target intermediate address to the target physical address specified by a corresponding stage-2 translation table entry corresponding to the target intermediate address.

In a system supporting two-stage address translation, the stage-1 address mappings are typically controlled by an operating system, while the stage-2 address mappings are typically controlled by a hypervisor. Hence, the memory system locations used to store the stage-1 address mappings are typically writable by the operating system, so that the operating system can maintain the address mappings and permissions represented by the stage-1 translation table entries. Modern operating system software may be relatively large and so may have many lines of code involving writes to memory, which could, if the address operand of a store instruction is set to correspond to a memory region used to hold a stage-1 translation table entry, be capable of causing updates to stage-1 translation table entries. Therefore, the operating system may present a large attack surface that could be used by an attacker to attempt to gain access to sensitive data or code or corrupt the functioning of software executing on the apparatus, by causing the operating system code to corrupt some of the stage-1 translation table entries so as to change access permissions or address mappings and circumvent the memory management controls intended to be implemented using the stage-1 translation table entries. Therefore, it may be desirable to provide a counter-measure to protect against corruption of some stage-1 translation table entries (it may not be necessary to apply this counter-measure to all stage-1 translation table entries, since some stage-1 translation table entries may correspond to memory regions used to hold non-sensitive information).

One approach that has been proposed for hardening the stage-1 translation tables against attack is to provide an alternate base address, separate from the base address used to point to the regular stage-1 translation tables. The alternate base address points to an alternate set of stage-1 translation tables. The alternate translation table base address and the alternate set of stage-1 translation tables may be controlled by a hypervisor rather than the operating system and may be used to control access to a certain subset of sensitive regions of address space. Translation table entries at each level of the alternate translation table structure may specify a restart indicator which indicates whether a translation table walk of the alternate set of stage-1 translation tables should be halted and restarted using the regular stage-1 translation tables instead. If no indication to restart the translation table walk is encountered during the walk of the alternate translation table structure, then eventually an address mapping (controlled by the hypervisor as part of the alternate translation tables) is reached and this can be used to identify the intermediate address of the memory region holding the sensitive information. However, if the restart indicator specifies that the translation table walk should be halted at a given level of the translation table structure and restarted, then a further translation table walk is initiated starting from the base address used for the regular stage-1 translation tables controlled by the operating system. This approach allows access to certain sensitive memory regions to be controlled based on the alternative translation table structure which cannot be tampered with by the operating system, while other memory regions which do not need to be protected against attack can have their accesses controlled based on the regular set of stage-1 translation tables set by the operating system. However, a problem with this approach is that for the accesses to the non-sensitive memory regions, the already slow translation table walk operation is made even slower (up to twice as long) because of performing two separate translation table walk operations: the first to walk the alternate translation table structure and the second to walk the regular translation table structure after halting the walk of the alternate structure. This may have a significant impact on performance, especially if the majority of the address space is not intended to be sensitive and so uses the regular stage-1 translation tables.

Another approach could be to use stage-2 access permissions, set for a stage-2 translation table entry corresponding to a memory region used to store a stage-1 translation table entry, to mark that memory region as read-only, which would prevent the operating system being able to update the stage-1 translation table entry. However, a problem with this approach is that often it is useful for operating systems to be able to update access tracking metadata in stage-1 translation table entries, to record information about how frequently a given memory region is accessed or written. For example, the metadata could include an access flag which is set to track that a corresponding memory region has been accessed at least once since the access flag was previously cleared, and/or a dirty flag which is set to indicate that at least one write to the corresponding memory region has occurred since the dirty flag was cleared. Another example of access tracking metadata could be an access counter which counts the number of accesses to the corresponding given memory region. Such access tracking metadata can be useful to allow the operating system to more efficiently manage paging of memory regions out to external storage (e.g. allowing the operating system to identify the least frequently accessed pages that are the best candidates for paging out to external storage). Hence, if the memory region used to store a stage-1 translation table entry was marked as read-only using stage-2 access permission information, this would prevent updates to access tracking metadata and may therefore lead to less efficient management of paging and other operations managed by the operating system, which risks loss of performance due to frequently accessed data being paged out to external storage due to loss of information on access frequency.

In the examples discussed below, the memory management circuitry performs permission checking for a memory access request based at least on stage-2 access permission information specified by the corresponding stage-2 translation table entry corresponding to the target intermediate address of the memory access. The stage-2 access permission information has an encoding specifying whether a memory region corresponding to the target intermediate address has a partially-read-only permission. The partially-read-only permission may be another permission option available for selection for a given memory region, as an alternative to other types of permission such as read-only, read/write, execute, read/execute, etc. While a read-only permission may prohibit all writes to the corresponding memory region, in contrast the partially-read-only permission specifies that, among write requests to the memory region corresponding to the target intermediate address, issued when the processing circuitry is in a predetermined execution state of the plurality of execution states, the write requests are permitted for a restricted subset of write request types but prohibited for write request types other than the restricted subset. The restricted subset of write request types includes at least a metadata-updating write request generated by the memory management circuitry to update access tracking metadata in translation table entries. The memory management circuitry rejects a memory access request in response to determining that the memory access request is a write request issued in the predetermined execution state, the stage-2 access permission information specifies that the memory region corresponding to the target intermediate address has the partially-read-only permission, and the memory access request is a write request type other than the restricted subset of write request types.

Hence, with this approach the hypervisor controlling the stage-2 access permissions can set a memory region used to store a stage-1 translation table entry as having the partially-read-only permission, which still allows updates to access tracking metadata to take place (which will tend to help improve performance by increasing efficiency of control of operations such as paging to external storage) but prevents at least some other request types from writing to the corresponding memory region. By restricting the ability to write to a region associated with the partially-read-only permission to a limited subset of write request types, this reduces the attack surface available for attackers to exploit, increasing protection against such attacks.

In some examples, the metadata-updating write request could be the only type of write request within the restricted subset. In this case, if the operating system needs to update a stage-1 translation table entry stored in a memory region marked by the stage-2 access permission information as partially-read-only, then the update may fail and trap to the hypervisor which could then determine whether the update requested by the operating system is appropriate and could then emulate the update before returning control to the operating system.

However, in practice, updates to stage-1 translation table entries may be relatively frequent and so trapping to a hypervisor on each update may affect performance. Therefore, it can be useful for the restricted subset of write request types to also comprise a write request issued in response to at least one predetermined type of translation table entry updating instruction executed by the processing circuitry in the predetermined execution state. On the other hand, a write request issued in response to at least one type of store instruction executed by the processing circuitry in the predetermined execution state may be excluded from the restricted subset of write request types. Hence, by limiting the types of write requests permitted to write to partially-read-only regions, this reduces the opportunity for attackers to modify the behaviour of store instructions to cause corruption of stage-1 address translation table entries. As the ability to write to partially-read-only regions is restricted to a limited subset of dedicated instruction types intended to update translation table entries, this means that other types of general purpose store instruction used in parts of the operating system code (not intended by the code author to update translation table entries) cannot be hacked to cause them to corrupt translation table entries stored in a partially-read-only region of memory. The translation table entry updating instruction could cause the processing circuitry to perform at least one additional check which would not be performed in response to other types of store instruction used to trigger writes to memory, to increase security.

The predetermined execution state may be an execution state associated with an operating system level of privilege. For example, in the examples below the predetermined execution state may be exception level EL1. In some examples the write restrictions imposed by the predetermined execution state may apply only when the processing circuitry is in that predetermined execution state or a less privileged execution state. Alternatively, the write restrictions for a region marked as partially-read-only could apply regardless of the current execution state, so that they apply in all execution states including the predetermined execution state. Nevertheless, since at least for memory access requests issued in the predetermined execution state, restrictions on the ability to write are imposed based on the partially-read-only permission so that some write request types issued in that predetermined execution state may be allowed and other write request types may not be allowed, this provides additional control, orthogonal to any privilege-based controls also being implemented, which can allow further restriction on the ability of an operating system to update data in certain memory regions used for storing stage-1 translation table entries, without compromising the ability of the memory management circuitry to issue writes for updating access tracking metadata in translation table entries.

In some implementations, the memory management circuitry is configured to permit a write request, which is issued in response to said at least one type of store instruction executed by the processing circuitry in a more privileged execution state than the predetermined execution state, to write to a memory region having the partially-read-only permission. However, in practice this is not essential, as typically the hypervisor operating in a more privileged execution state may in any case use a different set of translation tables from the stage-2 translation tables used by an operating system at the predetermined execution state, so that even if a memory region used to store a stage-1 translation table entry is marked as partially-read-only in the stage-2 translation tables used by the operating system, this does not mean that the same memory region has to be marked partially-read-only in the translation tables used by the hypervisor. That memory region could be defined as writable in the translation table used by the hypervisor, and so the hypervisor may still be able to set information in the corresponding stage-1 translation table entry (such as the stage-1 address mapping itself and/or a bitfield defining a protected entry as discussed further in examples below) even if stage-2 translation tables used by the operating system mark that region as partially-read-only.

The stage-2 access permission information could be specified by the corresponding stage-2 translation table entry either directly or indirectly (or a combination of both). With a direct specification, the encoding of the stage-2 translation table entry itself specifies the stage-2 access permission information. With an indirect specification, the encoding of the stage-2 translation table entry may specify a value referencing one of a plurality of sets of stage-2 access permission information stored in a structure separate from the stage-2 translation table entry. For example, a permission indirection register may be provided, comprising a number of permission fields which can each be set to an encoding indicating a corresponding permission type. Part of the stage-2 translation table entry may be interpreted as an index value used to select which of the permission fields of the permission indirection register provides the stage-2 access permission information for that stage-2 translation table entry. Hence, in some examples, the information specifying the partially-read-only permission could be specified directly in the stage-2 translation table entry. In other examples, the information specifying the partially-read-only permission could be specified indirectly by the stage-2 translation table entry specifying an index into a field of a stage-2 permission indirection register (or other data structure) which is encoded to indicate the partially-read-only permission. Using an indirect specification of access permissions can be useful because it allows software to update the permissions for a number of different translation table entries each referencing the same field of the indirection register by a single write to that field of the indirection register, rather than needing to update each translation table entry individually. In some implementations, using an indirection register can also help to support a larger number of options for permission types than could be encoded in the translation entry itself.

Protected Stage-1 Translation Table Entries

Some implementations may assume that all translation table entries stored within a memory region marked by stage-2 access permissions as partially-read-only should be considered read-only for write requests which are not one of the restricted subset of request types, which are issued in the predetermined execution state. However, in practice a given memory region corresponding to a stage-2 translation entry may store a translation table comprising a large number of different stage-1 translation table entries corresponding to different memory regions, and not all of those memory regions may need the corresponding stage-1 translation table entries protected against corruption by inappropriate write access requests from an operating system. For example, the memory regions represented by the different stage-1 translation table entries may correspond to a mix of sensitive and non-sensitive information. If it is still desired to allow an operating system to update the stage-1 translation table entries associated with non-sensitive information, despite the corresponding memory region being set in the stage-2 access permissions to have the partially-read-only permission, then one approach could be to trap each update to a hypervisor which could decide whether the update is permitted. However, such update requests may be relatively frequent and so this may cause loss of performance.

Therefore, in examples discussed below, each stage-1 translation table entry may have an encoding specifying whether that entry is a protected entry for which updates are restricted in comparison to stage-1 translation table entries not encoded as a protected entry. This enables entries corresponding to sensitive and non-sensitive information to be distinguished from each other to allow more stringent checks on updates for those protected entries compared to non-protected entries. For example, the predetermined type of translation table entry updating instruction discussed above, which is permitted to write to partially-read-only memory regions, could include a check of whether the data stored at a memory region targeted by a write request is encoded as a protected entry, and suppress the write to at least some bits of the memory region when the contents of the memory region are found to be encoded as a protected entry. On the other hand, for non-protected entries the write may be permitted in response to the translation table entry updating instruction (assuming any other access permission checks are satisfied). Hence, by providing support for encoding stage-1 translation table entries as protected entries, distinguishing from other non-protected entries, this can enable non-protected entries to be updated without hypervisor intervention, which can help to improve performance.

The apparatus may have protected-entry-checking circuitry to check whether to restrict an update to access permissions or address mappings specified by a given stage-1 translation table entry, based on whether the given stage-1 translation table entry is marked as a protected entry. Where the translation table entry specifies access-tracking metadata, the update to the access tracking metadata may not be restricted based on whether the entry is protected, and so metadata updating write requests generated by the memory management circuitry in hardware (for example during a page table walk operation) may be permitted even when the stage-1 translation table entry being updated is a protected entry.

The combination of the partially-read-only permission defined in stage-2 access permission information and the protected entry encoding used for stage-1 translation table entries can be particularly effective, when compared to use of either feature alone. Although it would be possible to support the partially-read-only permission at stage-2 without supporting the encoding of protected stage-1 translation table entries, as mentioned above this will tend to require more frequent traps to the hypervisor. Hence, the combination of these features can be particularly effective.

In some examples, the information of the stage-1 translation table entry that encodes whether the entry is the protected entry may be a dedicated bit or field which is treated as indicating whether the entry is the protected entry in all modes or operating states of the processing circuitry. However, it is also possible for the information of the stage-1 translation table entry used to encode whether the entry is the protected entry to be interpreted in different ways depending on an operating mode of the processing circuitry or depending on control state stored in a control register. For example, a control value in a control register could indicate whether a certain bit or bitfield of the stage-1 translation table entry is to be interpreted as indicating whether the entry is the protected entry, or to be interpreted in another way (e.g. according to a legacy encoding used in systems not supporting the protected entry encoding). Therefore, while the apparatus may support encoding a stage-1 translation table entry as a protected entry in at least one operating state, it is not essential that the stage-1 translation table entry encodes whether it is protected in all operating states of the processing circuitry. In some examples, whether the stage-1 translation table entry is protected may depend partially on the encoding of the entry itself, and partially on a control value stored in a control register.

Protected-Entry-Checking Type of Read-Check-Write Instruction

The processing circuitry may support a protected-entry-checking type of read-check-write (RCW) instruction for requesting an update to a given memory system location. Protected-entry-checking circuitry may be responsive to the processing circuitry executing the protected-entry-checking type of RCW instruction to: read data from the given memory system location, check whether the data read from the given memory system location has a value consistent with a stage-1 translation table entry specified as a protected entry, and in response to determining that the data read from the given memory system location has a value consistent with a stage-1 translation table entry specified as a protected entry, prevent an update-restricted subset of bits of the stage-1 translation table entry from being updated in response to the read-check-write instruction. Hence, by supporting, in the instruction set architecture supported by the processing circuitry, an instruction which triggers a check of whether the data to be updated has a value consistent with an encoding of a protected stage-1 translation table entry, this avoids the need to trap each update to the hypervisor, and hence provides a mechanism for the operating system to update non-protected stage-1 translation table entries without hypervisor intervention, to improve performance.

Note that the check of the read data may not be able to distinguish, for sure, whether the data is actually intended to be a stage-1 translation table entry or is just some data having a value set for other purposes. The check may determine whether the value of the data is consistent with an encoding of the stage-1 translation table entry specified as a protected entry (e.g. checking whether certain bits of the data match the values those bits would have if a protected stage-1 translation table entry was stored at the given memory system location).

The protected-entry-checking type of RCW instruction may be one of the restricted subset of write request types permitted to write to a partially-read-only region of memory, so that it may pass the stage-2 access permission checks when the region of memory is marked as partially-read-only.

The setting of information specifying whether a given stage-1 translation table entry is a protected entry may be controlled by software, such as a hypervisor, executing at a higher privilege level than the predetermined execution state. For example the hypervisor could specify certain protected stage-1 translation table entries when first writing a set of stage-1 translation table entries to memory when initialising a corresponding operating system. This is possible because the stage-2 translation table entries of the translation table structure used by the hypervisor may not restrict writing to the corresponding memory structures from being written by the hypervisor. While the operating system may then subsequently be allowed to update non-protected stage-1 translation table entries, the protected entries may have at least some bits which are immutable in response to instructions executed by the operating system.

The read, check and write of the protected-entry-checking type of RCW instruction may be performed as an atomic operation by the protected-entry-checking circuitry. Hence, the read, check and write may be treated as an indivisible set of operations whose outcome is either observed completely or not observed at all, so that is not possible for other software processes executing on the data processing apparatus to see a partial result of executing the protected-entry-checking type of RCW instruction, or to write to the memory location being read/written by the RCW instruction in the period between the read and the write being performed for the RCW instruction. This protects against race conditions arising which could occur if it was possible for another software process to write to the given memory system location in the period between the read and the write performed in response to the protected-entry-checking type of RCW instruction.

In cases when the update to the memory system location is permitted following the check of the protected entry encoding, and so at least one bit of the given memory system location is updated in response to the protected-entry-checking type of RCW instruction, the protected-entry-checking circuitry may prohibit the update to the given memory system location from changing the protected specification of a stage-1 translation table entry stored at the given memory system location. Hence, while for non-protected entries, the operating system may be allowed to update parts of that entry, the operating system cannot use the RCW instruction to cause the entry to become a protected entry. Also, protected entries cannot be converted to non-protected entries by executing the protected-entry-checking type of RCW instruction. This ensures that the protections put in place for certain stage-1 translation table entries by a hypervisor cannot be circumvented by the operating system executing the RCW instruction, and that an attacker cannot cause an arbitrary translation table entry created by the attacker from being marked as protected which might cause other security checks, which rely on the assumption that a protected entry is authorised by the hypervisor, to be circumvented.

Different implementations may have different mechanisms for controlling the extent to which update to a protected stage-1 translation table entry are restricted.

In some examples the update-restricted subset of bits could comprise all bits of the stage-1 translation table entry. Hence, in cases when the protected-entry-checking type of RCW instruction is executed and it is found that the data read from the given memory system location has a value consistent with a protected stage-1 translation table entry, then the requested update to the data at the given memory system location may be suppressed in its entirety. Nevertheless, this does not prevent access-tracking metadata in the stage-1 translation table entry being updated in response to metadata-updating write requests generated in hardware by the memory management circuitry during our translation table walk (the protected-entry-check used to restrict updates in response to the RCW instruction does not apply to metadata-updating write requests).

In other examples, the update-restricted subset of bits could comprise a proper subset of bits of the stage-1 translation table entry, so that even for a protected entry some bits can still be updated by the protected-entry-checking type of RCW instruction while other bits are prohibited from being update. The update-restricted subset of bits may include at least any one or more bits used to encode whether the stage-1 translation table entry is a protected entry, to protect against the operating system being able to convert a protected entry to a non-protected entry or vice versa as discussed above. However, it is recognised that there may be other bits of the stage-1 translation table entry which can be updated by an operating system without risk of circumventing the protections intended by the hypervisor, and so it may be useful to allow some bits to be updated even if the entry is a protected entry.

In examples where the update-restricted subset of bits comprises a proper subset of bits (with at least one other bit not having updates restricted in response to the protected-entry-checking type of RCW instruction), some implementations may fix the selection of which subset of bits is the updated-restricted subset of bits. Hence, the selection of which bits are in the proper subset of bits may be non-programmable. For example, the choice of update-restricted bits can be a hardwired architectural choice prescribed by an instruction set architecture supported by the processing circuitry.

Alternatively, the selection of which bits are in the update-restricted subset of bits may be programmable, depending on a software-programmable selection value stored in a control register. This can allow certain software to program which particular bits should have their updates restricted, depending on the needs of that software. For example, the ability to update the software-programmable selection value stored in the control register may be restricted to software executing in an execution state having at least a certain threshold level of privilege, which could for example be a hypervisor-level of privilege. The software executing in the predetermined execution state described above may not be allowed to write to the software-programmable selection value.

In some implementations, each valid stage-1 translation table entry may have the encoding specifying whether that entry is a protected entry. However, invalid stage-1 translation table entries may be incapable of being encoded as protected or non-protected, and could be assumed to be non-protected entries by default. In this case, invalid entries may be allowed to be updated by the RCW instruction, with any part of the entry being allowed to be updated as long as the update does not cause the entry to become valid and protected. Hence, in response to determining that the data read from the given memory system location has a value consistent with an invalid stage-1 translation table entry, the protected-entry-checking circuitry may permit updates of the invalid stage-1 translation table entry other than an update which causes the data at the given memory system location to become a valid stage-1 translation table entry specified as a protected entry.

However, in other implementations both valid and invalid stage-1 translation table entries may have an encoding specifying whether that entry as a protected entry. In this case, in response to determining that the data read from the given memory system has a value consistent with an invalid stage-1 translation table entry specified as a protected entry, the protected-entry-checking circuitry may prevent an invalid-entry-update-restricted subset of bits of the given memory system location from being updated in response to the read-check-write instruction; and in response to determining that the data read from the given memory system has a value consistent with a valid stage-1 translation table entry specified as a protected entry, the protected-entry-checking circuitry may prevent a valid-entry-update-restricted subset of bits of the given memory system location from being updated in response to the read-check-write instruction. This approach can be useful because it allows a hypervisor to initialise a set of stage-1 translation table entries where some entries are protected, including some invalid entries which are not currently able to be used to permit access to memory, but which may later be made valid, while still being protected against unauthorised updates in the period when the translation table entry is not yet valid.

In some implementations the valid-entry-update-restricted subset of bits could be at the same bit positions as the invalid-entry-update-restricted subset of bits. Alternatively, the valid-entry-update-restricted subset of bits could be a different subset of bits of the translation table entry encoding compared to the invalid-entry-update-restricted subset of bits. The valid-entry-update-restricted subset of bits could be either all bits of the stage-1 translation table entry, a non-programmably-selected proper subset of bits of the stage-1 translation table entry, or a programmably-selected proper subset of bits of the stage-1 translation table entry depending on a software-programmable valid-entry-update-restricted-bit selection value stored in a control register. Similarly, the invalid-entry-update-restricted subset of bits could be either all bits of the stage-1 translation table entry, a non-programmably-selected proper subset of bits of the stage-1 translation table entry, or a programmably-selected proper subset of bits of the stage-1 translation table entry depending on a software-programmable invalid-entry-update-restricted-bit selection value stored in a control register. The approach taken for selecting which bits are the valid-entry-update-restricted subset of bits can be either the same or different to the approach taken for selecting which bits are the invalid-entry-update-restricted subset of bits. For example, all bits of valid protected entries could have their updates restricted, while only a subset of bits of invalid protected entries could have their updates restricted. Alternatively, the update-restricted bits could be programmably selected for one of the invalid/valid entries but not the other. For example, one example implementation could provide a mask register to select which bits are the valid-entry-update-restricted subset of bits, but the selection of which bits are the invalid-entry-update-restricted subset of bits may be a fixed choice prescribed by the instruction set architecture. Hence, it will be appreciated that there are a wide variety of options for selecting which bits are update-restricted in both valid and invalid stage-1 translation table entries.

In some examples, a valid stage-1 translation table entry may comprise a first bitfield indicating whether that valid stage-1 translation table entry is a protected entry; and an invalid stage-1 translation table entry may comprise a second bitfield indicating whether that invalid stage-1 translation table entry is a protected entry. The first and second bitfields could either be at the same bit positions within a stage-1 translation table entry encoding, or at different bit positions within a stage-1 translation table entry encoding. In some cases, locating the first and second bitfields at different bit positions may offer more flexibility for software in how it lays out its data. Invalid translation table entry encodings are used by software for any arbitrary non-translation table data. In a valid translation table entry encoding there may only be limited bits available for encoding the "protected status". Therefore, if the bitfields used to encode the protected status were at the same bit position in both valid and invalid entries, this may constrain how software can use its data in memory locations not intended for use as a translation table entry. By allowing the bitfield positions of the first and second bitfields to differ, the second bitfield within an invalid stage-1 translation table entry encoding may be located at a position which is less likely to cause inconvenience for software's use of normal data, even if that position is not suitable for the valid stage-1 translation table entry due to the bit positions already allocated for other information within a valid stage-1 translation table entry.

The suppression of updates to the update-restricted subset of bits of a (valid or invalid) protected stage-1 translation table entry can be permitted in different ways. In some examples, if it is determined that at least one of the update-restricted subset of bits is being requested to be updated and the data read from the given memory system location has an encoding consistent with the data representing a protected entry, then the protected-entry-checking circuitry could simply suppress the update of the given memory system location in its entirety, including any updates to bits other than the update-restricted subset of bits. In this case, the write fails if it attempts to write to any update-restricted bit.

In other examples, only the update of the update-restricted subset of bits may be suppressed, while an update of at least one other (non-update-restricted) bit of the given memory system location may still be permitted. In this case, for a protected entry, the write succeeds for updates to bits that the write is allowed to update, but does not change the update-restricted bits even if requested to do so based on operands of the RCW instruction.

In response to the protected-entry-checking type of read-check-write instruction, the processing circuitry may set at least one condition status value to indicate whether at least part of the update requested by the protected-entry-checking type of read-check-write instruction was suppressed based on the check of whether the data read from the given memory system is a stage-1 translation table entry specified as a protected entry. The at least one condition status value can be tested by a subsequent conditional instruction (such as a conditional compare instruction or conditional branch instruction) to allow a subsequent operation to be made conditional on whether or not the update requested by the RCW instruction was successful. Where it is useful to know whether the RCW instruction succeeded or failed, this can help to improve performance because it means that there is no need to execute a further set of instructions to determine whether the write was successful.

The protected-entry-checking type of RCW instruction can be implemented in various ways. For example, the processing circuitry could support any one or more of the following variants of the protected-entry-checking type of RCW instruction:

a swap variant of the protected-entry-checking type of read-check-write instruction, in response to which the processing circuitry is configured to write the data read from the given memory system location to a destination register for use as an operand by a subsequent instruction. This variant can be useful so that the subsequent instruction can perform an operation conditional on the previous state of the translation table entry prior to the update.

a store variant of the protected-entry-checking type of read-check-write instruction, for which the processing circuitry is configured to process the store variant without writing the data read from the given memory system location to a destination register. This variant can be useful if there is no need for a subsequent operation to depend on the old contents of the given memory system location, to avoid consuming a destination register unnecessarily. In some examples, the swap and store variants could have a common encoding, and when the destination register specifier of the swap variant specifies a predetermined value, this could cause the instruction to be treated as the store variant which does not need to return the data read from the given memory system location. Other architectures could provide the store variant as a standalone instruction separate from the swap variant.

a compare-and-swap variant of the protected-entry-checking type of read-check-write instruction specifying a compare operand, for which the protected-entry-checking circuitry is configured to determine whether a comparison of the data read from the given memory system location and the compare operand satisfies a comparison condition, suppress the update to the given memory system location when the comparison condition is unsatisfied, and write the data read from the given memory system location to a destination register for use as an operand by a subsequent instruction. The compare-and-swap variant may also cause status information to be set for indicating whether the comparison condition was satisfied (e.g. setting one or more condition flags which can be tested by a subsequent conditional instruction). In response to the compare-and-swap variant, the status information may be set to a different state when the comparison condition is unsatisfied compared to when the comparison condition is satisfied but at least part of the requested write operation is suppressed due to the read data being encoded as a protected stage-1 translation table entry when the write was requesting an update to an update-restricted bit.

a bit set/clear instruction for which the update of the given memory system location comprises setting or clearing at least one selected bit of the data at the given memory system location. For example, an operand of the bit set/clear instruction may specify a bit mask indicating the positions of the bits to be set or cleared in the data at the given memory system location. Optionally, the bit set/clear instruction can also cause the data read from the given memory system location to be returned to a destination register for use as an operand by a subsequent instruction, similar to the swap variant and compare-and-swap variants.

It will be appreciated that not all of these variants need to be supported in any given implementation of the data processing apparatus.

Anti-Aliasing

The techniques discussed above can be useful for allowing a certain set of stage-1 translation table entries to be protected against corruption by an operating system under attack by a malicious party. This may protect an entry which maps a particular virtual address to a particular intermediate address against corruption. However, it is possible to provide two or more different stage-1 translation table entries mapping different virtual addresses to the same intermediate address. Therefore, even if a particular stage-1 translation table entry is safeguarded against corruption (by use of the partially-read-only permission and optionally the protected entry encoding), there could be a risk that an attacker may attempt to set another stage-1 translation table entry mapping another virtual address to the same intermediate address specified by the safeguarded stage-1 translation table entry, to circumvent the protection applied to that safeguarded entry. One approach for addressing this problem could be to introduce checks when setting or using stage-1 translation table entries to check that they do not map to an intermediate address already mapped using a protected stage-1 translation table entry, but this would be extremely costly in terms of performance and difficult to implement in practice.

In examples discussed below, a given stage-2 access translation table entry corresponding to a given intermediate address has an encoding specifying whether the memory region corresponding to the given intermediate address has an anti-aliasing property indicative of a requirement that, for an access to the memory region corresponding to the given intermediate address to be allowed, each of one or more walked stage-1 translation table entries that would be accessed in a translation table walk of the stage-1 translation structure to locate the corresponding stage-1 translation table entry specifying the stage-1 address mapping from a given virtual address to the given intermediate address are required to satisfy an anti-aliasing condition. The anti-aliasing condition for a given walked stage-1 translation table entry is considered satisfied when either: (a) the given walked stage-1 translation table entry is specified as a protected entry and the partially-read-only permission is specified by the stage-2 access permission information for a relevant stage-2 translation table entry which provides the stage-2 address mapping used to derive a physical address of the memory system location storing the given walked stage-1 translation table entry, or (b) a read-only permission is specified by the stage-2 access permission information for the relevant stage-2 translation table entry. The memory management circuitry rejects the memory access request in response to determining that the corresponding stage-2 translation table entry specifies that the memory region corresponding to the target intermediate address has the anti-aliasing property and that any of the one or more walked stage-1 translation table entries fails to satisfy the anti-aliasing condition.

This approach protects against the attack discussed above based on aliasing of stage-1 translation table entries. If there is a given intermediate address corresponding to sensitive-information which needs to be protected against attack, for which the stage-1 translation table entries used to identify a mapping a virtual address to that intermediate address are protected by storing that entry in partially-read-only memory and encoding that stage-1 translation table entry as a protected entry, the hypervisor controlling stage-2 translation table entries can also mark the given stage-2 translation table entry corresponding to the given intermediate address as having the anti-aliasing property. This means that even if an attacker causes the operating system code to create a new stage-1 translation table entry mapping to the same intermediate address, or modify existing stage-1 translation table entries on the path of traversal through a translation table walk so that a different virtual address becomes mapped to the same intermediate address, the attacker will not be able to cause both: the new/modified stage-1 translation table entry to be stored in a partially-read-only region of memory (as the attacker cannot control the stage-2 access permissions), and the new entry to be encoded as a protected entry (if the region written to by the attacker was already indicated as a partially-read-only region, the attacker would need to use the restricted subset of write requests to carry out the write, e.g. using the RCW instruction mentioned above, and such write request types may have a restriction imposed that it cannot cause the value being written to become a protected stage-1 translation table entry). Also, the attacker could not write a new aliasing entry to a read-only region. Hence, by checking, on an access to a memory region for which the anti-aliasing property is defined in the corresponding stage-2 translation table entry, whether each of the walked stage-1 translation table entries (that would be walked in a traversal of the stage-1 translation table structure to reach the stage-1 address mapping from the given virtual address to the given intermediate address) satisfy the anti-aliasing condition (based on either the PRO or read-only permission being set at stage-2, and if PRO is specified that the stage-1 entry is also a protected entry), this prevents attackers being able to use aliasing as a means of circumventing the protections discussed above using the partially-read-only permission and protected stage-1 entry features.

Similar to the partially-read-only permission and protected entry encoding discussed above, the anti-aliasing property could be specified either directly or indirectly by the stage-2 access translation entry, and could be indicated by either a dedicated bit or bitfield or by a repurposed bit or bitfield whose interpretation depends on an operating state of the processing circuitry or on control information specified in a control register.

Stage-1 Top-Level Base Address Protection Checks

The memory management circuitry can determine a stage-1 top-level base address of a stage-1 top-level translation table of the stage-1 translation table structure based on a value in a stage-1 translation table base address register. Although the features described above can protect against corruption of certain stage-1 translation table entries, another way an attacker may attempt to circumvent these protections may be to modify the stage-1 top-level base address to point to a different address from the one intended for authorised usage, so as to substitute the protected set of stage-1 translation tables for an alternative set of stage-1 translation tables defined by the attacker.

One approach for policing against such attacks can be to trap any updates to the stage-1 translation table base address register requested by an operating system, to cause a hypervisor to check whether the update requested by the operating system is appropriate. Hence, it may not be essential to provide any hardware-enforced checks for updates to the stage-1 translation table base address register.

However, in practice updates to the stage-1 translation table base address register by the operating system may be relatively frequent (e.g. the operating system may do this on each context switch) and so trapping each update to the hypervisor may incur a performance cost. Therefore, some additional checking can be useful to improve performance.

One example of such additional checking may be a stage-1 top-level table partially-read-only check, which enforces a requirement that the stage-1 top-level base address should correspond to a memory region for which the associated stage-2 translation table entry specifies the partially-read-only permission discussed above. Hence, when a stage-1 top-level table partially-read-only check is enabled, the memory management circuitry signals a fault in response to determining that the stage-1 top-level base address corresponds to an intermediate address for which an associated stage-2 translation table entry does not specify the partially-read-only permission. For example, this check may be performed at the time of performing a translation table walk based on the stage-1 top-level base address stored in the stage-1 top-level base address register. This check means that the hypervisor can define as partially-read-only the regions of memory holding the stage-1 top-level translation tables permitted to be used by the operating system (which may have been verified as safe by the hypervisor already). The attacker cannot define an arbitrary stage-1 top-level translation table in some other region of memory and be able to cause that arbitrary stage-1 top-level translation table to be used for page table walks, and so cannot use reprogramming of the base address as means to bypass the protected mappings and partially-read-only protections defined for the correct stage-1 translation tables accessible via the correct base address mapping to a partially-read-only region defined by the hypervisor in a corresponding stage-2 translation table entry.

In some implementations, the stage-1 top-level partially-read-only check may be considered permanently enabled, so that there may not be any programmable control of whether this check is enabled or disabled.

However, in other implementations, the memory management circuitry may determine whether the stage-1 top-level table partially-read-only check is enabled based on a stage-1 top-level partially-read-only check enable control value stored in a control register. The ability to write to the stage-1 top-level partially-read-only check enable control value in the control register may be restricted to software executing at a threshold level of privilege or higher (e.g. the threshold level of privilege may be a hypervisor-level of privilege, more privileged than the privilege associated with the pre-determined execution state mentioned earlier). By providing the ability to enable or disable the stage-1 top-level table partially-read-only check, this allows for backwards compatibility with legacy software not designed to use the partially-read-only permission.

Another example of a check to police against inappropriate updates to the stage-1 translation table base register may be a stage-1 top-level table presence permission check based on a stage-1 top-level table presence permission set for a memory region using either the stage-1 or stage-2 translation table structures. The stage-1 top-level table presence permission signifies that the corresponding memory region is allowed to be allocated for storing the stage-1 top-level translation table which can validly be used as the top level of translation table accessed in a stage-1 translation table walk based on the address in the stage-1 top-level base address register. Hence, when the stage-1 top-level table presence permission check is enabled, the memory management circuitry determines whether a given memory region corresponding to the stage-1 top-level base address is associated with a stage-1 top-level table presence permission indicating that the given memory region is allowed to be allocated for storing the stage-1 top-level table of the stage-1 translation table structure, and triggers a fault when the given memory region corresponding to the stage-1 top-level base address does not have the stage-1 top-level table presence permission.

The stage-1 top-level table presence permission check helps to police against a further type of attack where the attacker may update the address in the stage-1 top-level base address register to point to a memory region used to store one of the further-level stage-1 translation table entries intended to be used at a further level of the stage-1 translation table structure other than the top-level. In other words, rather than trying to create a brand new translation table entry, the attacker could also cause inappropriate access to memory by causing an entry at a later level of the translation table structure to be treated as an entry at an earlier level of the translation table structure, so that the bits of a target address used to select from that translation table entry are not the intended subset of bits (different levels of table being indexed by different subsets of bits of the input address to a translation table walk), causing the address mappings or access permissions specified by the inappropriately accessed entry at the later level of the translation table structure to be applied to a different virtual address from the one intended by the party who established the translation table structure. Such an attack can be protected against using the stage-1 top-level table presence permission because the memory regions used to hold stage-1 translation table entries other than the top-level translation table entries can be defined not to have the stage-1 top-level table presence permission, and so if the attacker updates the stage-1 top-level base address to point to such an entry then the lack of permission to store a top-level entry is detected and then this may cause a fault to be signalled.

In some implementations, where at least two stage-1 top-level base address registers are provided to store stage-1 top-level base addresses for use in different memory access scenarios, at least two variants of the stage-1 top-level table presence permission could be supported, each variant corresponding to a respective subset of the plurality of stage-1 top-level base address registers. When a given variant of the stage-1 top-level table presence permission is specified for a given memory region, the corresponding memory region is indicated as allowed to be allocated for storing the stage-1 top-level translation table accessed using one of the corresponding subset of stage-1 top-level base address registers for the given variant, but is not allowed to be allocated for storing the stage-1 top-level translation table accessed using a stage-1 top-level base address register which is not a member of the corresponding subset for the given variant. Hence, a fault may be triggered if there is an attempt to perform a page table walk using a particular stage-1 top-level base address register specifying an address in a memory region assigned a stage-1 top-level table presence permission for which the corresponding subset of stage-1 top-level base address registers does not include the particular stage-1 top-level base address register. By supporting different stage-1 top-level table presence permissions indicating permission to use the corresponding memory region for the stage-1 top-level translation table for respective specific subsets of base address registers, this allows for more precise control, e.g. so that a base address intended for use in one of the base address registers can be prevented from being used for another base address register.

For example, in an implementation supporting a first stage-1 top-level base address register and a second stage-1 top-level base address register, the variants of the stage-1 top-level table presence permission could include at least two of:
  a first variant where the corresponding subset includes the first stage-1 top-level base address register but not the second stage-1 top-level base address register;
  a second variant where the corresponding subset includes the second stage-1 top-level base address register but not the first stage-1 top-level base address register; and
  a third variant where the corresponding subset includes both the first and second stage-1 top-level base address registers.

In one example, when performing a stage-1 page table walk for a given virtual address, the memory management circuitry could select which of the first and second stage-1 top-level base address registers to use for accessing the stage-1 top-level translation table, based on whether or not a portion of most significant bits of the given virtual address is all zero. The number of most significant bits considered for this selection can be either fixed, or programmable using a control value configured by software. This approach can be useful, for example, to allow for the upper and lower ranges of the virtual address space to be translated using different sets of translation tables. For example, the lower address range with the most significant bits of the address all set to zero could be used for user address space and the upper address range with at least one non-zero bit in the most significant portion of the address can be used for kernel address space.

It may be possible for the stage-1 top-level table presence permission for a given memory region to be encoded within stage-1 access permissions of a stage-1 translation table entry corresponding to that given memory region, but in that case it may be desirable to implement at least one further protection mechanism to prevent the bits used to encode the stage-1 top-level table presence permission from being modified by instructions executing in an execution state having the operating system level of privilege.

Instead, it may be more convenient for the memory management circuitry to determine whether the given memory region is associated with the stage-1 top-level table presence permission based on an encoding of an associated stage-2 translation table entry corresponding to the stage-1 top-level base address. By using the associated stage-2 translation table entry to signify whether a given memory region is allowed to hold a stage-1 top-level translation table, this simplifies control over updates to stage-1 translation table entries triggered by operating system code, which will not generally be able to update stage-2 translation table entries.

Again, in some implementations the stage-1 top-level table presence permission check could be considered permanently enabled.

Alternatively, the memory management circuitry may determine whether the stage-1 top-level table presence permission check is enabled based on a stage-1 top-level table presence permission check enable control value stored in a control register. The ability to write to the stage-1 top-level table presence permission check enable control value in the control register may be restricted to software executing at a threshold level of privilege or higher (e.g. the threshold level of privilege may be a hypervisor-level of privilege). By providing the ability to enable or disable the stage-1 top-level table partially-read-only check, this provides backwards compatibility with legacy software which does not use the stage-1 top-level table presence permission.

Also, in implementations where there are two or more variants of the stage-1 top-level table presence permission supported corresponding to different subsets of base address registers as discussed above, there could be at least one further control defined by at least one control value stored in a control register, which indicates whether the different variants of the stage-1 top-level table presence permission should be treated as only enabling the use of the corresponding memory region for the corresponding subset of stage-1 top-level base address registers, or whether each variant can be used to enable the corresponding memory region to be used for any of the stage-1 top-level base address registers. Hence, the fault described above, triggered when the base address register used to provide the stage-1 top-level base address is not one of the subset of base address registers enabled by the variant of the stage-1 top-level table presence permission specified for the memory region including the stage-1 top-level base address, can be enabled or disabled based on the at least one further control. In some examples, separate controls could be provided for configuring whether the fault is generated for particular combinations of the stage-1 top-level base address register used and the variant of the stage-1 top-level table presence permission. For example, one control value may be provided for controlling whether the fault is generated on a page table walk using a base address in the second stage-1 top-level base address register when the memory region including the base address has the first variant of the stage-1 top-level table presence permission described above, and a second control value may be provided for controlling whether the fault is generated on a page table walk using a base address in the first stage-1 top-level base address register when the memory region including the base address has the second variant of the stage-1 top-level table presence permission.

In some examples which support both the stage-1 top-level table partially-read-only check and the stage-1 top-level table presence permission check, it may be possible to separately enable or disable these checks individually, using separate enable control values. Alternatively, a single control value could enable/disable both checks together, so that the options supported may be either that both checks are enabled or that both checks are disabled, but it may not be possible to enable one check but not the other.

Other implementations may not support both types of check. For example, in some implementations one or other of these checks may be considered sufficient.

As for the partially-read-only permission, the stage-1 top-level table presence permission could be specified by a translation table entry either directly or indirectly (or a combination of both), using information specified directly in the encoding of the translation table entry and/or information specified indirectly by the translation table entry with reference to a permissions register, for example.

Architecture Simulation

The techniques discussed above may be implemented within a data processing apparatus which has hardware circuitry provided for implementing the instruction decoder and processing circuitry discussed above.

However, the same technique can also be implemented within a computer program which executes on a host data processing apparatus to provide an instruction execution environment for execution of target code. Such a computer program may control the host data processing apparatus to simulate the architectural environment which would be provided on a hardware apparatus which actually supports target code according to a certain instruction set architecture, even if the host data processing apparatus itself does not support that architecture. The computer program may have processing program logic and memory management program logic which emulates functions of the processing circuitry and memory management circuitry discussed above, including support for the partially-read-only permission and the various checks discussed above. Such a simulation program can be useful, for example, when legacy code written for one instruction set architecture is being executed on a host processor which supports a different instruction set architecture. Also, the simulation can allow software development for a newer version of the instruction set architecture to start before processing hardware supporting that new architecture version is ready, as the execution of the software on the simulated execution environment can enable testing of the software in parallel with ongoing development of the hardware devices supporting the new architecture. The simulation program may be stored on a storage medium, which may be an non-transitory storage medium.

Specific Example of Data Processing Apparatus

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU), which is an example of memory management circuitry, 28 is provided for performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and access permissions which govern, for example, whether a given process executing on the pipeline is allowed to read, write or execute instructions from a given memory region.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline implementation, and the processor may include many other elements not illustrated for conciseness. While FIG. 1 shows a single processor core with access to memory 34, the apparatus 2 also could have one or more further processor cores sharing access to the memory 34 with each core having respective caches 8, 30, 32.

Figure 2:
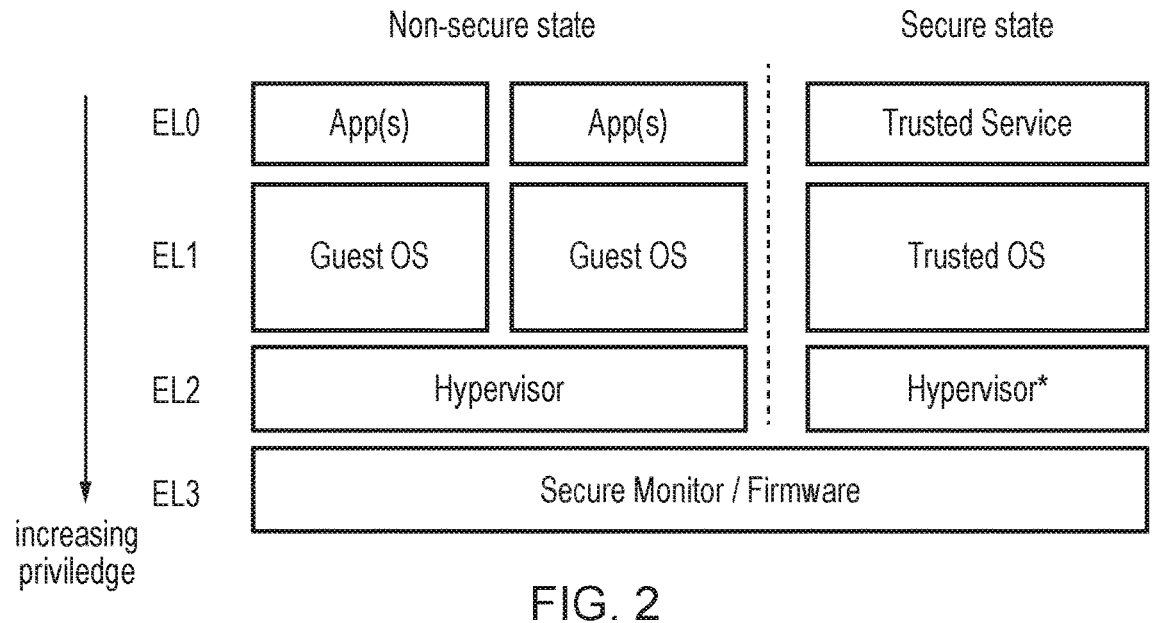
FIG. 2 illustrates an example of execution states of the processing circuitry.

FIG. 2 is a diagram illustrating different execution states (also referred to as exception levels) in which the processing circuitry 4 can operate when executing instructions. In this example there are four exception levels EL0, EL1, EL2, EL3, where exception level EL0 is the least privileged exception level and exception level EL3 is the most privileged exception level. In general, when executing in a more privileged exception level, the processing circuitry may have access to some memory locations or registers 14 which are inaccessible to lower, less privileged, exception levels.

In this example, exception level EL0 is for executing applications which are managed by corresponding operating systems or virtual machines executing at exception level EL1. Where multiple virtual machines coexist on the same physical platform then a hypervisor may be provided operating at EL2, to manage the respective virtual machines. Although FIG. 2 shows examples where the hypervisor manages the virtual machines and the virtual machines manage applications, it is also possible for a hypervisor to directly manage applications at EL0.

Although not essential, some implementations may implement separate hardware-partitioned secure and non-secure domains of operation for the processing circuitry. The data processing system 2 may have hardware features implemented within the processor and the memory system to ensure that data and code associated with software processes operating in the secure domain are isolated from access by processes operating in the non-secure domain. For example, a hardware architecture such as the TrustZone® architecture provided by Arm® Limited of Cambridge, UK may be used. Alternatively other hardware enforced security partitioning architectures could be used. Secure applications (trusted services) may operate in exception level EL0 in the secure domain and secure (trusted) operating systems or virtual machines may operate in exception level EL1 in the secure domain. In some implementations, there is no support for EL2 in the secure state and the hypervisor may execute solely in non-secure EL2. In other implementations, there may be support for a secure hypervisor executing in secure EL2 as indicated by the asterisk in FIG. 2. In some examples, a secure monitor program for managing transitions between the non-secure domain and the secure domain may be provided executing in exception level EL3. Other implementations could police transitions between the security domains in hardware so that the secure monitor program may not be needed.

Address Translation

One task performed by the MMU 28 is address translation between virtual addresses (VAs) and physical addresses (PAs). Software executing on the processing circuitry 4 specifies memory locations using virtual addresses, but these virtual addresses can be translated by the MMU 28 into physical addresses identifying the memory system location to access. A benefit of using virtual addresses is that it allows management software, such as an Operating System (OS), to control the view of memory that is presented to software. The OS can control what memory is visible, the virtual address at which that memory is visible, and what accesses are permitted to that memory. This allows the OS to sandbox applications (hiding the resources of one application from another application) and to provide abstraction from the underlying hardware. Another benefit of using virtual addresses is that an OS can present multiple fragmented physical regions of memory as a single, contiguous virtual address space to an application. Virtual addresses also benefit software developers, who will not know a system's exact memory addresses when writing their application. With virtual addresses, software developers do not need to concern themselves with the physical memory. The application knows that it is up to the OS and the hardware to work together to perform the address translation.

In practice, each application can use its own set of virtual addresses that will be mapped to different locations in the physical system. As the operating system switches between different applications it re-programs the map. This means that the virtual addresses for the current application will map to the correct physical location in memory.

Virtual addresses are translated to physical addresses through mappings. The mappings between virtual addresses and physical addresses are stored in translation tables (sometimes referred to as page tables). Translation tables are stored in memory and are managed by software, typically an OS or hypervisor. The translations tables are not static, and the tables can be updated as the needs of software change. This changes the mapping between virtual and physical addresses.

Figure 3:
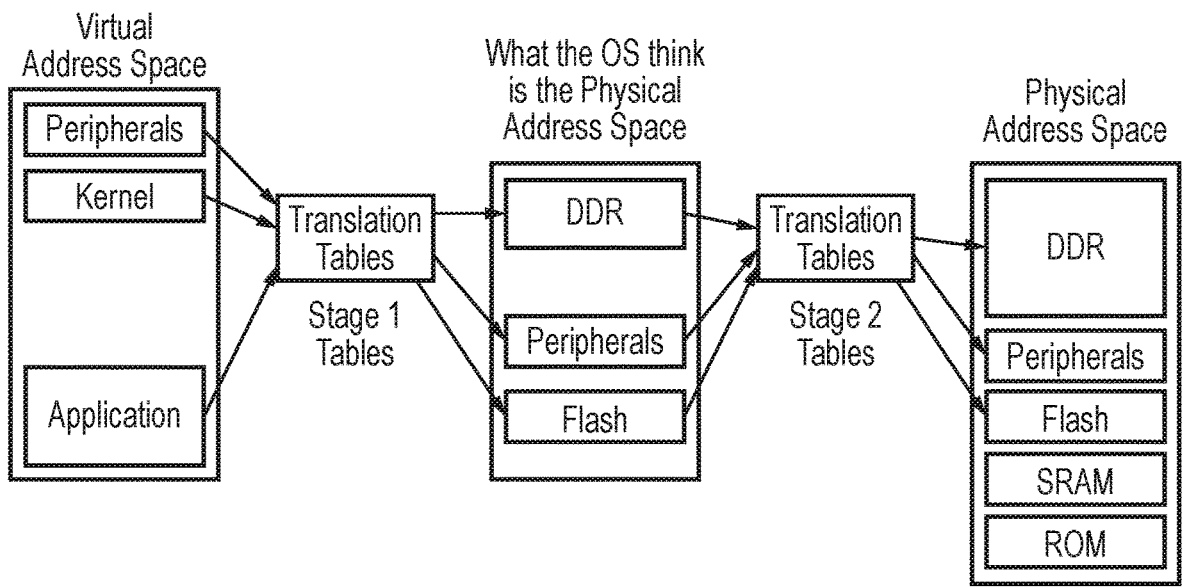
FIG. 3 illustrates two-stage address translation.

For memory accesses performed when the processing circuitry 4 is in a certain subset of execution states (in particular, when the processing circuitry 4 is in non-secure EL0 or non-secure EL1), two-stage address translation is used as shown in FIG. 3 (for other execution states one stage of address translation using the stage-1 page tables is sufficient). Hence, the virtual addresses from Non-secure EL0 and Non-secure EL1 are translated using two sets of tables. These tables support virtualization and allow the hypervisor to virtualize the view of physical memory that is seen by a given virtual machine (VM) (the virtual machine corresponding to a guest operating system and the applications controlled by that guest operating system). We call the set of translations that are controlled by the OS, Stage 1. The Stage 1 tables translate virtual addresses to intermediate physical addresses (IPAs—an example of the intermediate addresses mentioned earlier). In Stage 1, the OS thinks that the IPAs are physical address spaces. However, the hypervisor controls a second set of translations, which is called Stage 2. This second set of translations translates IPAs to physical addresses.

Figure 4:
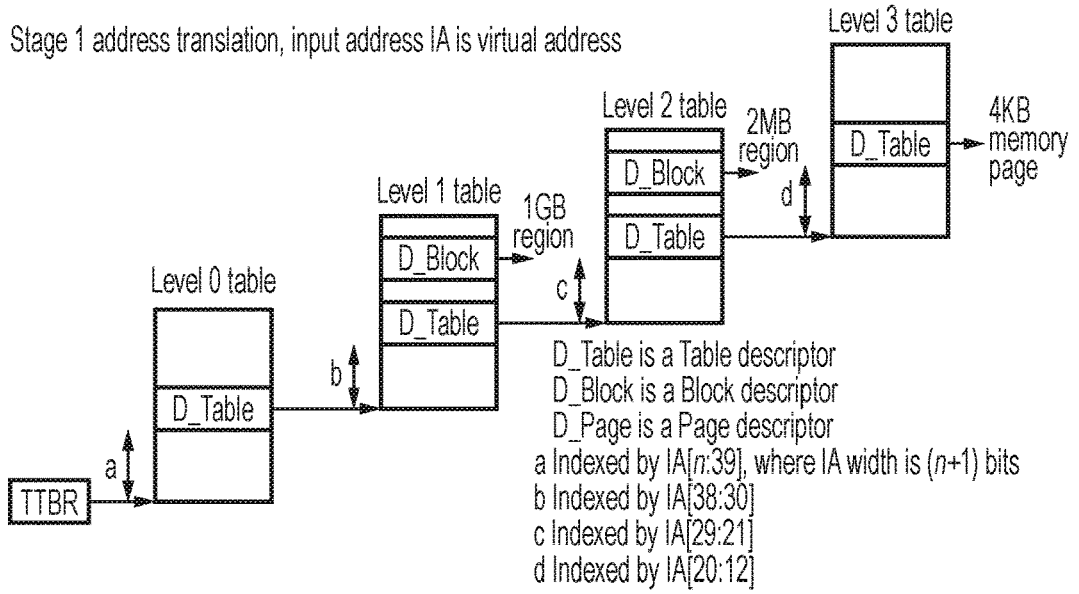
FIGS. 4 and 5 illustrate an example of translation table walks for stage-1 and stage-2 address translation respectively.
Figure 5:
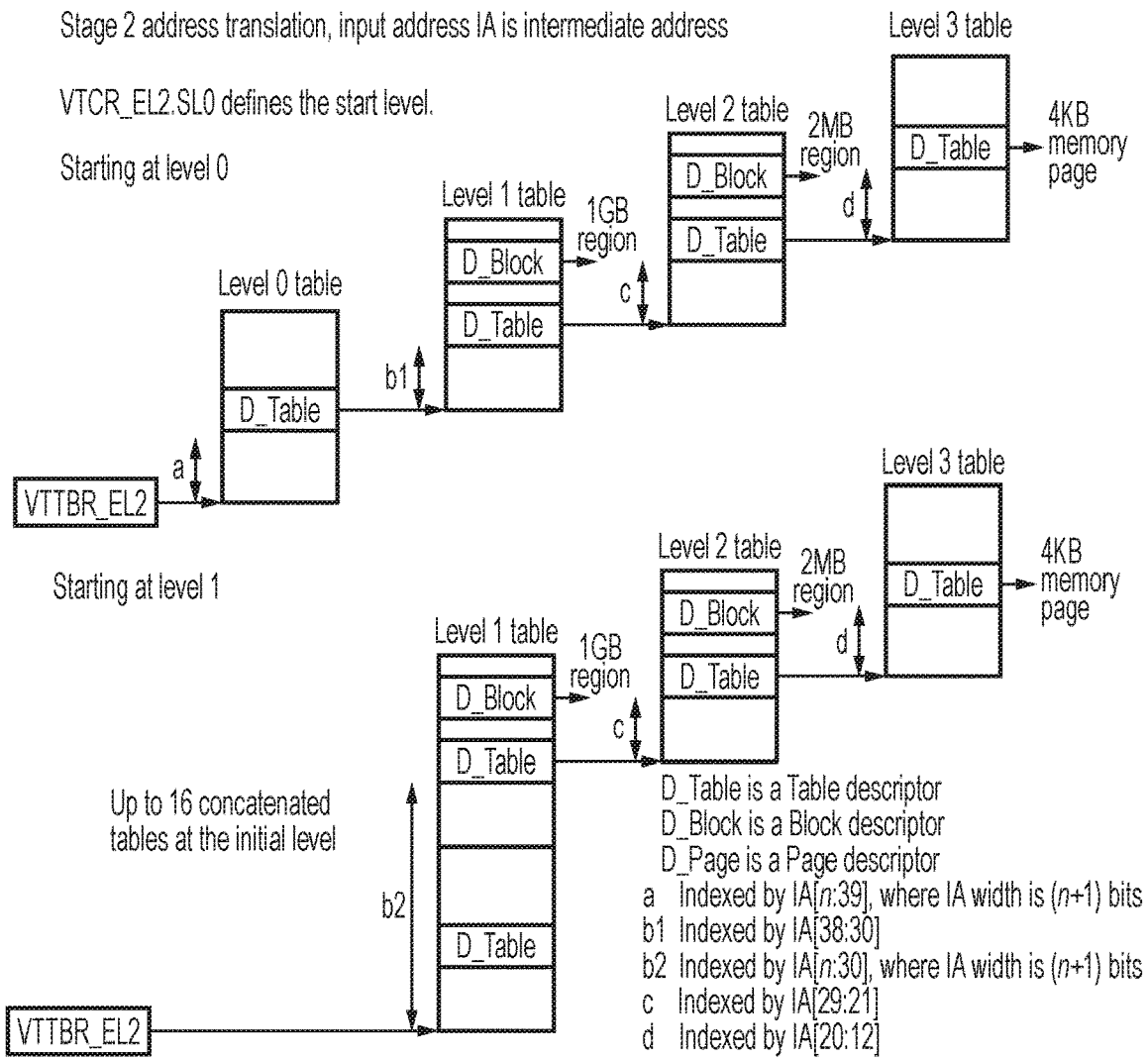

The stage-1 and stage-2 translation tables are implemented as hierarchical table structures comprising a number of levels of translation tables as shown in FIGS. 4 and 5 for stage-1 and stage-2 respectively. In this example, both the stage-1 and stage-2 tables can have up to 4 levels of page tables, namely level 0 (L0), level 1 (L1), level 2 (L2) and level 3 (L3).

Figure 6:
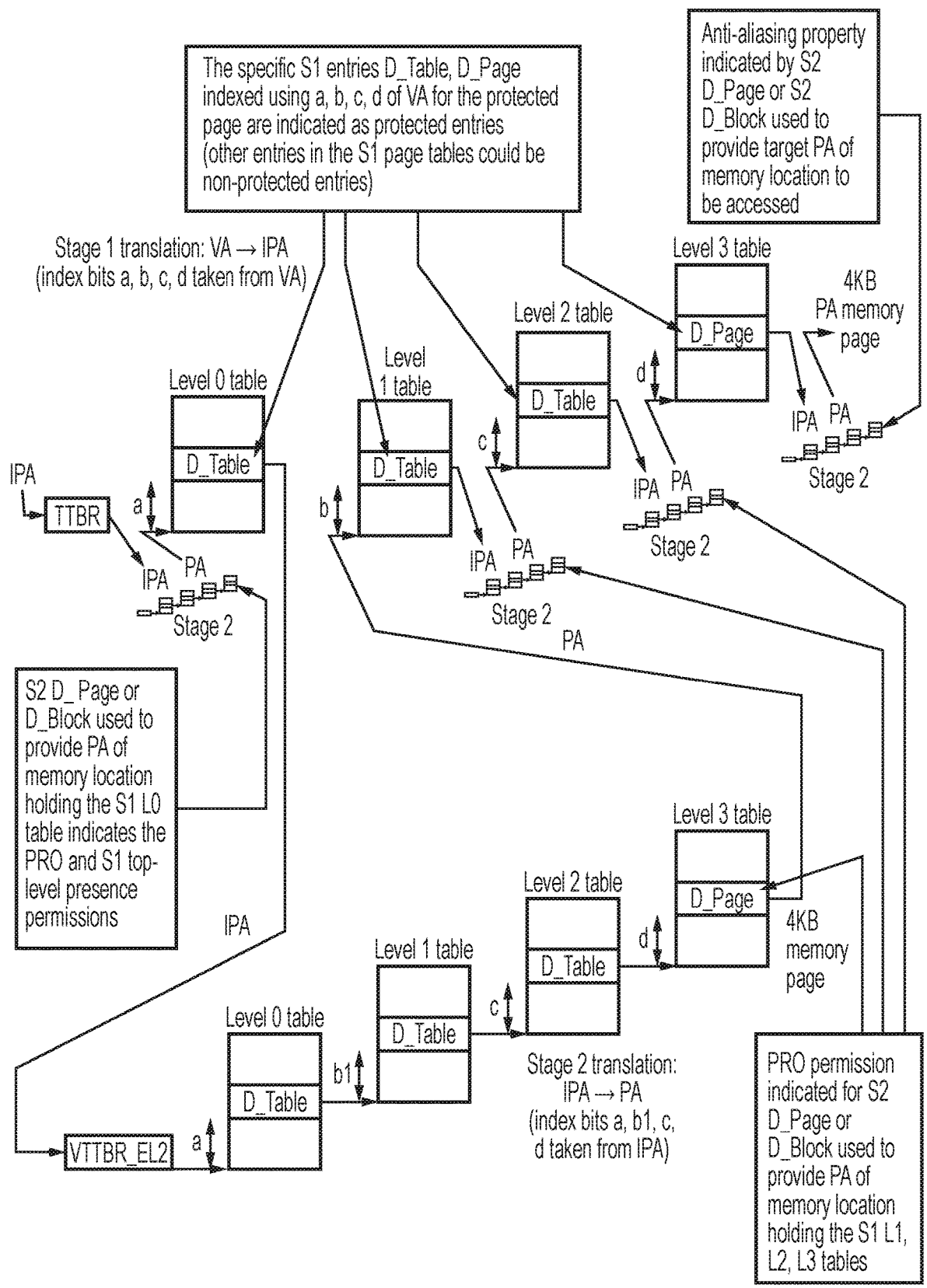
FIG. 6 illustrates table lookups performed for a full translation table walk of both stage-1 and stage-2 translations, when considering that each table base address and the final intermediate address determined at stage 1 is to be translated to a physical address using a respective stage-2 translation.

To locate the physical address mapping for a given address, a translation table walk is performed comprising one or more translation table lookups. The translation table walk is the set of lookups that are required to translate the virtual address to the physical address. For the Non-secure EL1&0 translation regime, this set includes lookups for both the stage 1 translation and the stage 2 translation (see FIG. 6 shown below). The information returned by a successful translation table walk using stage-1 and stage-2 lookups is:

The required physical address (translated based on the stage-1 mapping to the intermediate address and the stage-2 mapping to the physical address).

Access permissions and/or memory attributes for the target memory region, which provide information about how to control access to that memory region. These may include stage-1 access permissions and/or attributes defined in the stage-1 table structure and stage-2 access permissions and/or attributes defined in the stage-2 table structure.

For traversing a given one of the stage-1 and stage-2 structures, the walk starts with a read of a top-level (L0) translation table for the initial lookup, based on an address specified in a translation table base address register (TTBR for stage 1, VTTBR_EL2 for stage 2). Each translation table lookup returns a descriptor, that indicates one of the following:

The entry is the final entry of the traversal of the stage-1 or stage-2 structure, which provides the address mapping being sought. If the entry is in the final L3, this entry is called a Page descriptor (D_Page), while if the entry providing the final entry of the walk is at one of the higher levels it is called a Block descriptor (D_Block). The final entry of the traversal contains the output address (OA—i.e. IPA for stage 1 or PA for stage 2), and the permissions and attributes for the access. If a Block descriptor is found at a higher level of the translation table structure, this means that the Block descriptor represents a memory region of greater size than a 4 kB memory page represented by a single entry at L3 (the particular sizes represented by Block descriptors at L1 and L2 being dependent on the number of index bits used to index into the L1 or L2 tables—in this example L1 and L2 Block descriptors represent 1 GB and 2 MB regions respectively).

An additional level of lookup is required. In this case, the entry is called a Table descriptor (D_Table), since it provides the translation table base address for that lookup in a further level of table. The Table descriptor can optionally also provide other hierarchical attributes that can be applied to the final translation. An encoding of translation table entries at levels 1 and 2 distinguishes a Block descriptor from a Table descriptor.

The descriptor is invalid. In this case, the memory access generates a Translation fault.

FIG. 4 illustrates indexing of the stage-1 translation tables using respective bits of a virtual address provided as the input address for the table lookups. The base address of the top-level table L0 is read from TTBR, and the base addresses of the L1, L2, L3 tables are indicated by addresses stored in the indexed Table descriptors in the L0, L1, L2 tables respectively (if no Block descriptors are identified in L1 or L2 tables—if a Block descriptor is found in the indexed entry of L1 or L2 then the traversal is halted at that level as the output address mapping has already been found). The particular entry to select within a given level of stage-1 translation table is determined based on an index value a, b, c, d which corresponds to a certain subset of bits of the virtual address provided as input address for the lookup. FIG. 4 illustrates which bits of the input address are used for each index value a, b, c, d in one particular example. The address of the relevant entry in a given table is obtained by adding a multiple of the index bits a, b, c or d to the base address of that given table as determined based on TTBR or the address specified in a Table descriptor at the previous level (the multiplier applied to the index value corresponding to the size of one translation table entry).

Similarly, FIG. 5 illustrates indexing of the stage-2 translation tables using respective bits of an intermediate address provided as the input address for a stage-2 table lookup. The indexing is similar to that shown in FIG. 4 for stage 1, but uses a different base address register VTTBR_EL2 to provide the base address of the L0 table. As shown in the example of FIG. 5, for stage-2 lookups it is possible to vary the starting level at which the walk of the stage-2 translation table starts, based on a value stored in a control register VTCR_EL2.SL0 which can specify that the lookup should start at either L0 or L1. If the stage-2 lookup starts at L0 then the indexing for levels 0, 1, 2, 3 uses index values a, b1, c, d respectively similar to FIG. 4 for stage-1. If the stage-2 lookup starts at L1 then the indexing is performed in a similar way, but now a greater number of index bits b2 are used at the top level (L1) of the lookup as shown in FIG. 5. Providing variable starting levels is not an essential feature and could be omitted if desired. Although not shown in FIG. 4, it would also be possible to provide a variable starting levels for a lookup at stage-1.

As shown in FIG. 6, in practice when the full translation table walk including both stage-1 and stage-2 translation is performed, then each stage-1 table base address obtained from the TTBR and the Table descriptors accessed in the stage-1 L0, L1, L2 translation tables will be an intermediate address which itself needs translating using the stage-2 translation tables. Hence, in cases when the translation table walk does not encounter any Block descriptors, but proceeds all the way to L3 where a Page descriptor is found, then the full page table walk process may include accessing the multiple levels of page tables in the following sequence:

Stage-2 translation of the base address of the stage-1 L0 page table into a physical address (the stage-1 L0 base address is typically an intermediate physical address because the stage 1 translations are configured by the operating system). The stage-2 translation comprises 4 lookups (stage-2 L0; stage-2 L1; stage-2 L2; stage-2 L3).

Stage 1 L0 lookup of an entry at the address obtained based on the L0 index portion "a" of the target virtual address and the translated stage-1 L0 base address, to obtain the stage-1 L1 base address (an intermediate physical address)

Stage-2 translation of the stage-1 L1 base address into a physical address (again, comprising 4 lookups).

Stage 1 L1 lookup of an entry at the address obtained based on the L1 index portion "b" of the target virtual address and the translated stage-1 L1 base address, to obtain the stage-1 L2 base address (an intermediate physical address)

Stage-2 translation of the stage-1 L2 base address into a physical address (again comprising 4 lookups)

Stage 1 L2 lookup of an entry at the address obtained based on the L2 index portion "c" of the target virtual address and the translated stage-1 L2 base address, to obtain the stage-1 L3 base address (an intermediate physical address)

Stage-2 translation of the stage 1 L3 base address into a physical address (again comprising 4 lookups).

Stage 1 L3 lookup of an entry at the address obtained based on the L3 index portion "d" of the target virtual address and the translated stage-1 L3 base address, to identify the target intermediate physical address corresponding to the target virtual address.

Stage-2 translation of the target intermediate physical address into the target physical address which represents the location in memory to access corresponding to the original target virtual address (again, comprising 4 lookups).

Hence, without any caching, and assuming the starting level for stage 2 is L0, the translation would comprise 24 lookups in total. If the starting level for stage 2 is L1, this can reduce the number of lookups to 19 (one less lookup for each of the 5 stage-2 translations performed). Nevertheless, as can be seen from the above sequence, performing the entire page table walk process can be very slow as it may require a large number of accesses to memory to step through each of the levels of page tables for each of the stages of address translation. This is why it is often desirable to cache information derived from translation table walks in the TLB 29 of the MMU 28. The cached information can include not only a final stage-1 address mapping from VA to IPA, a final stage-2 mapping from IPA to PA, or a combined stage-1 and stage-2 mapping from VA direct to PA (derived from previous lookups of the stage 1 and stage 2 structures), but also entries from higher level page tables of the stage 1 and the stage 2 tables can be cached within the TLB 29 of the MMU 28. This can allow at least some steps of the full page table walk to be bypassed even if the final level address mapping for a given target address is not currently in the address translation cache.

FIG. 6 is annotated with information specifying particular permissions or properties that could be defined for some of the translation table entries involved in the two-stage address translation. This will be described in more detail later once these permissions and properties have been explained below.

Memory Management Unit Example

Figure 7:
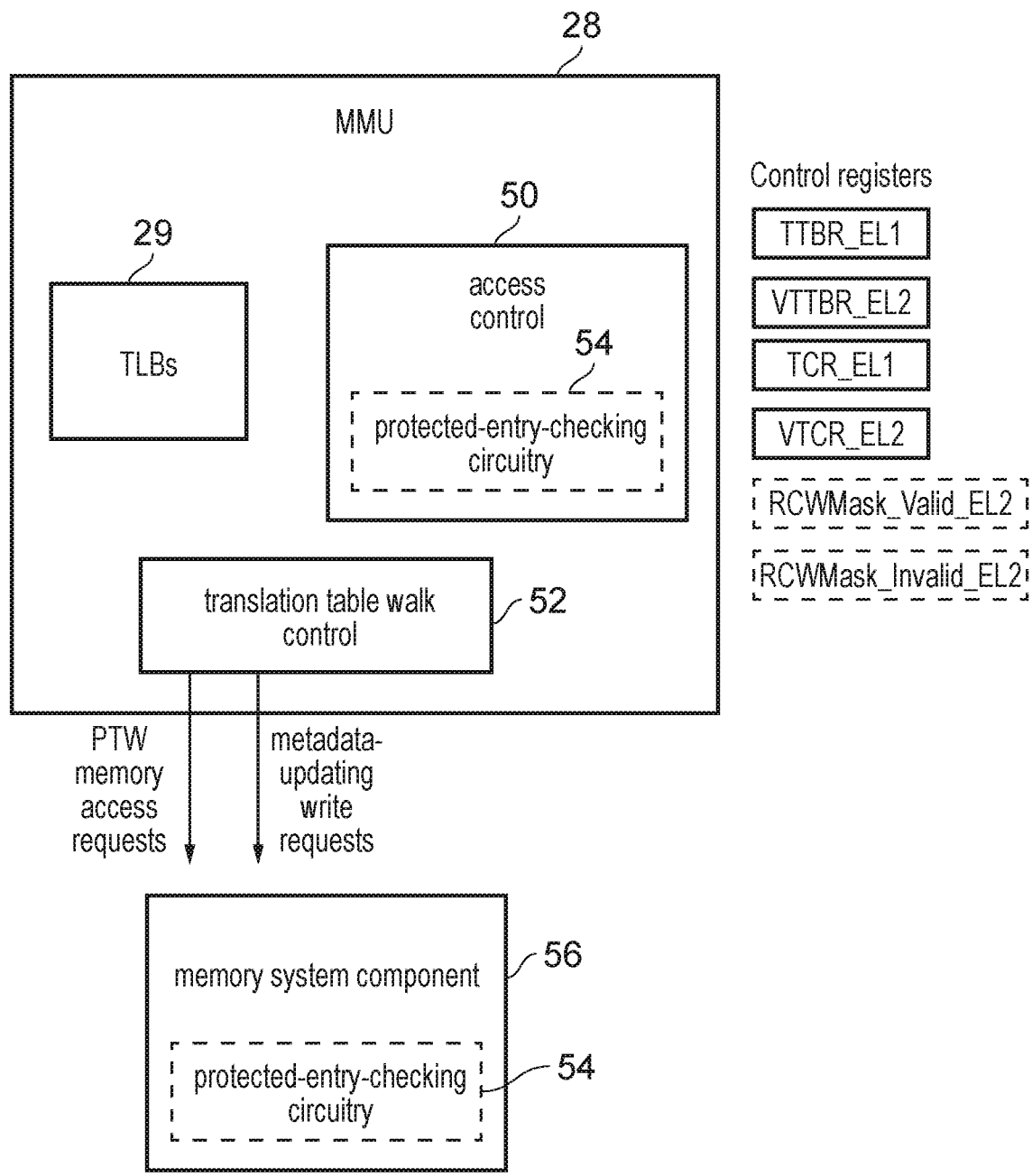
FIG. 7 illustrates an example of the memory management circuitry and control registers for controlling memory management.

FIG. 7 illustrates the memory management unit 28 in more detail. While FIGS. 1 and 7 show a single MMU 28 for conciseness, it is also possible for separate instruction-side and data-side MMUs to be provided to handle memory management operations for instruction fetch accesses initiated by the fetch stage 6 and data accesses initiated by the load/store unit 26 respectively—in this case both instruction-side and data-side MMUs may have the components shown in FIG. 7. As well as the TLBs 29, the MMU 28 includes access control circuitry 50 for checking the access permissions specified in looked up translation table entries and controlling handling of a memory access request according to those access permissions. For example, the access control circuitry 50 may implement checks for determining whether the specific type of memory access request (e.g. based on whether the request is a read, write or instruction fetch request, or based on the type of instructions executed that caused the request to be issued) satisfies the permissions specified in a corresponding translation table entry for a given region of memory being accessed. The MMU also includes translation table walk control circuitry 52 which, in the event that required information from the translation tables is not available already in the TLBs 29, issues memory access requests to memory to request reading of translation table entries during the translation table walk process as shown above in FIGS. 4 to 6. The translation table walk control circuitry 52 can be responsible for generating the addresses of the memory system locations to be read to obtain the relevant translation table entries in the stage-1 or stage-2 translation table structure. In addition, while performing a translation table walk, the translation table walk control circuitry 52 may generate metadata-updating write requests which request updates to access tracking metadata within certain translation table entries being traversed in the translation table walk. These metadata-updating write requests may update the access tracking metadata to reflect that a particular memory region has been accessed, which can be useful for managing operations such as paging. The metadata-updating write requests are generated in hardware, to specify addresses which are not directly specified as an instruction fetch address, or load/store target address derived from operands of load/store instructions executed by the processing circuitry 4, as the addresses of the metadata-updating write requests are addresses of the translation table entries accessed in the translation table walk, rather than addresses of the data or instruction being accessed.

The MMU 28 has access to various control registers for controlling translation table walks and other aspects of memory management operations. For example, the control registers may include the stage-1 and stage-2 base address registers TTBR_EL1, VTTBR_EL2 as mentioned earlier with respect to FIGS. 4 and 5. The stage-1 base address in register TTBR_EL1 is writable in response to instructions executing at exception level EL1, EL2 or EL3. The stage-2 base address in register TTBR_EL2 is writable in response to instructions executing at exception level EL2 or EL3. It is possible in some cases to set a control value to indicate that writes to TTBR_EL1 triggered by instructions executing at EL1 should be trapped to EL2 so that the hypervisor operating at EL2 can check the update being requested by the operating system and prevent the update if necessary. The control registers also include registers TCR_EL1, VTCR_EL2 which are used to specify various control status values which affect the way in which stage-1 and stage-2 translations and access permission checks are performed. For example, the control value specifying the starting level for a stage-2 walk may be specified in VTCR_EL2. Also, the TCR_EL1 or VTCR_EL2 control registers may specify control values specifying what types of security checks are enabled/disabled. As discussed in more detail below, the control registers can also include mask registers (labelled RCWMask_Valid_EL2 and RCWMask_Invalid_EL2) for specifying an update-restricted subset of bits for which updates are restricted in protected stage-1 translation table entries for valid and invalid entries respectively. It will be appreciated that further control registers can also be provided, and that the labels used for the control registers could vary. For example, one or more permission indirection registers could be provided to specify indirect access permission information which can be referenced by a given translation table entry to specify the access permissions information for the given translation table entry. Also it is possible for the same information to be arranged within control registers in different formats, so the particular allocation of information to one control register or another is not an essential feature.

As shown in FIG. 7, the apparatus may have protected-entry-checking circuitry 54 for performing a protected-entry check when an update is requested to a stage-1 translation table entry encoded as a protected entry (this will be described in more detail below). As shown in the dotted lines in FIG. 7, it is possible to implement the protected-entry-checking circuitry 54 at different locations within the processing system. For example, the protected-entry-checking circuitry 54 could be part of the access control circuitry 50 of the MMU 28. Alternatively, the protected-entry-checking circuitry could be implemented within the memory system component 56 closer to the physical memory system location being accessed by a given memory access request to be checked using the protected-entry-checking circuitry 54. For example, the memory system component 56 could be a cache 30, 32, an interconnect used to manage access to shared memory by multiple processor cores, or a memory controller associated with a particular memory storage unit. Also, the protected-entry-checking circuitry 54 could include distributed logic at multiple locations in the system (e.g. the MMU 28, the load/store unit 26 and/or the memory system component 56).

Translation Table Access Permissions and Attributes

Figure 8:
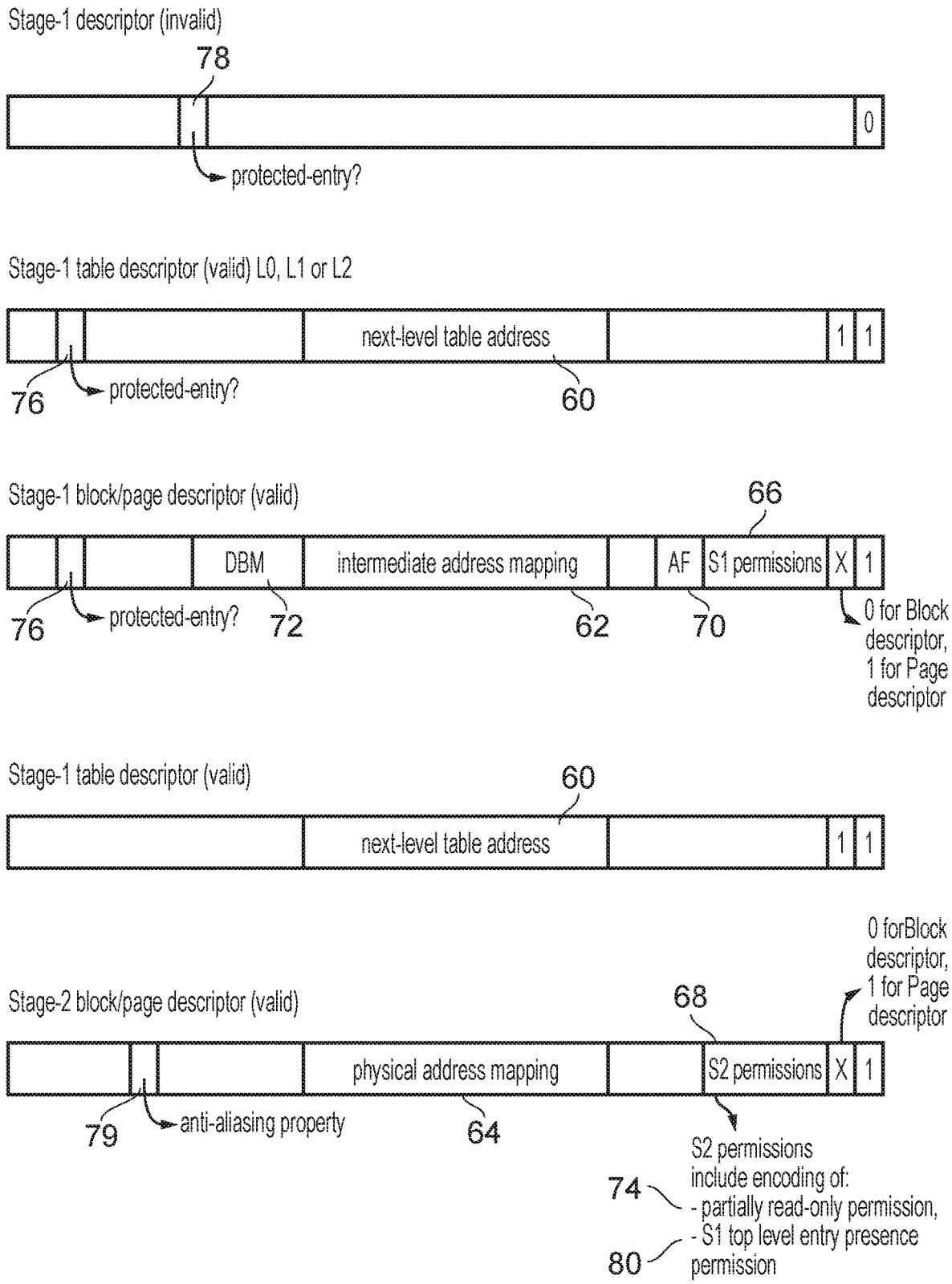
FIG. 8 illustrates an example of translation table entries for stage-1 and stage-2 address translation.

FIG. 8 illustrates example formats for translation table entries in the stage-1 and stage-2 translation table structures. It will be appreciated that the same information could be represented in different arrangements and so the particular ordering and layout of fields within the descriptors can vary from what is shown in FIG. 8.

In this example, valid translation table descriptors have a least significant bit set to 1 and invalid translation table descriptors have a least significant bit set to 0. For valid descriptors read at one of levels 0, 1, 2 of the translation table structure, the second least significant bit distinguishes whether the descriptor is a Table descriptor (second least significant bit set to 1) or a Block descriptor (second least significant bit set to 0). Page descriptors at L3 of the stage-1 or stage-2 structures may have the second least significant bit set to 1 to allow a Page descriptor to be distinguished from a Block descriptor. Of course, valid/invalid entries, and Table/Block/Page descriptors could also be distinguished by other encoding methods.

For both stage-1 and stage-2 entries, a valid Table descriptor provides the next-level table address 60 which indicates the base address of a translation table at the next level of the stage-1 or stage-2 translation table structure. Valid stage-1 Block or Page descriptors provide the intermediate address mapping 62 corresponding to the virtual address used to index the stage-1 translation table structure. Valid stage-2 Block or Page descriptors provide the physical address mapping 64 corresponding to the intermediate address used to index the stage-2 translation table structure.

Stage-1 Block and Page descriptors also provide stage-1 access permissions 66 used to control access to the corresponding memory region. For example, the stage-1 access permissions 66 (typically set by the OS at EL1) may specify whether the region is allowed to be read, written and/or used for an instruction fetch of executable instruction.

Similarly, stage-2 Block and Page descriptors provide stage-2 access permissions 68 used to control access to the corresponding memory region. Again, the stage-2 access permissions 68 (typically set by the hypervisor at EL2) may specify whether the region is allowed to be read, written and/or used for an instruction fetch of executable instruction. If there is a conflict between the stage-1 access permissions 66 and the stage-2 access permissions 68 then the more restrictive set of attributes may take precedence.

Stage-1 or stage-2 Block/Page descriptors can also specify other attributes associated with the memory region, not shown in FIG. 8. For example, these attributes could specify properties such as whether it is allowed to cache data from the corresponding memory region, whether the region is defined as Device memory such that reordering or merging of different memory accesses to the device memory is not allowed, etc.

The stage-1 Block/Page descriptors can also specify access-tracking metadata which can be used by an operating system to track frequency of access to a given memory region. For example, the metadata may include an access flag (AF) 70 and a dirty bit modifier (DBM) 72.

Periodically, the operating system could clear the access flag in entries corresponding to a set of memory regions to be monitored. When a read access is made to one of these memory regions, the access flag 70 may be set (if not set already following an earlier access) in the corresponding stage-1 Block or Page descriptor (the memory access request which causes the access flag 70 to be set may be one of the metadata-updating write requests generated by the translation table walk control circuitry 52 mentioned earlier). After a period of monitoring, the operating system can then check the access flag 70 to assist with operations which may benefit from information about how frequently certain pages are accessed. For example, the operating system could maintain a further tracking data structure in memory with entries per memory region which track how many times the memory region has been accessed, and so at the end of each period of monitoring the entries of that further tracking structure which correspond to memory regions with the access flag is 70 set could be incremented. After a number of periods of monitoring that further tracking structure will therefore provide an indication of relative frequency of accesses to the corresponding memory region. This can provide useful information for controlling operations such as paging, where it can be useful to know the least frequently accessed pages of memory for which the corresponding data may be prioritised for paging out to external storage compared to other more frequently accessed pages.

Similarly, the DBM 72 assists with tracking which pages have been subject to writes. If the operating system wishes to track whether a given page has been written, when the page is mapped or at the start of a period of monitoring, the operating system can set the access permissions for that page as "read-only" (even if the page is intended to be allowed to be written) and set the DBM bit 72. On an access permission fault caused by a write to a read-only page when the DBM bit 72 is set, the operating system may determine from the DBM bit 72 being set that this is not a "real" violation of a read-only permission, and instead cause the operating system to update a data structure stored in memory that tracks the pages subject to write requests, and also update the write access permission for the page to indicate that the page can now be written to without triggering a fault. After a period of monitoring, the tracking data structure in memory can be used by software to determine whether, on paging out a particular region, it is necessary to write back the modified data form that region to external storage, or whether (if no writes have occurred), the data stored in the on-chip memory can simply be discarded on paging out the region, as the corresponding data in external memory can be assumed to still be the same if the data is clean.

The access flag 70 and dirty bit modifier 72 are just some examples of possible access tracking data that could be stored within translation table entries and other examples could provide other types of access tracking metadata. E.g. in another example, a multi-bit access counter could be provided as access tracking metadata. Also, in another example instead of the DBM bit 72 being used to modify handling of read-only access permission violations on a write request and to trigger updating of the write permission, the DBM flag 72 could instead be directly updated in response to the first write to a page after clearing the DBM flag 72, in a similar way to the way in which the access flag 70 is updated on the first access to a page as described earlier.

As shown in FIG. 8, the various translation table descriptors can also include a number of other pieces of information which can be useful for protecting stage-1 translation table entries against corruption by operating system code under attack by an attacker. Typical operating system code may include many lines of code which may be difficult to fully verify as safe against attack, and so it is desirable to provide architectural mechanisms for protecting against the possibility that an attacker may be able to modify the behaviour of the operating system code to cause writes to regions of memory used to store translation table entries, in an attempt to modify the address mappings or the permissions in those entries so as to give the attacker rights to access regions of memory in an unauthorised manner.

As shown in FIG. 8, the additional attributes and permissions described below for hardening stage-1 translation tables against attack include the following:

Stage-2 Block/Page descriptors specify stage-2 access permissions 68 having an encoding indicating whether the corresponding memory region has a partially-read-only (PRO) permission (the partially-read-only permission could also be referred to as a "mostly-read-only" permission);

Valid stage-1 descriptors at all levels of the stage-1 translation table structure (including Table descriptors and Block/Page descriptors) have an encoding specifying whether that translation table entry is a "Protected" entry for which additional protection against unauthorised updates is provided compared to non-protected entries. For example, a bitfield 76 within a valid stage-1 descriptor may signify whether the entry is a Protected entry.

Invalid stage-1 descriptors at all levels of the stage-1 translation table structure may also have an encoding specifying whether that translation table entry is a "Protected" entry. This may be indicated using a bit field 78 which may be at a different position within the translation table entry encoding compared to the bit field 76 used to signify protected entries for valid stage-1 translation table entries.

Stage-2 Block/Page descriptors may have an indicator 79 specifying whether the corresponding memory region has an anti-aliasing property. In some examples, the presence or absence of anti-aliasing property could be encoded in a combined bitfield which can also signal other types of property, or alternative the anti-aliasing bitfield can be a standalone bitfield which does not signal any other information. If specified, the anti-aliasing property indicates that, for an access to the corresponding physical address to be allowed, all the stage-1 translation table entries accessed in the translation table walk to obtain the intermediate address used to access that stage-2 descriptor would need to be specified as Protected entries using bitfield 76 and to be stored in regions of memory for which the corresponding stage-2 Block/Page descriptor indicates the partially read-only permission 74.

Stage-2 Block/Page descriptors may also specify, in the stage-2 access permissions 68, a stage-1 top-level entry presence permission 80 indicating whether the corresponding memory region is allowed to hold the top-level translation table for the stage-1 translations (i.e. the stage-1 L0 table in the example of FIGS. 4 and 6). In one example, the encoding of the stage-2 access permissions 68 may be such that the stage-1 top-level entry presence permission is encoded as a further attribute of the PRO permission, so that the values allowed to be encoded for the stage-2 access permissions 68 may include values indicating:

PRO permission without stage-1 top-level entry presence permission;

PRO permission with stage-1 top-level entry presence permission; or one or more other types of permission not having either PRO permission or stage-1 top-level entry presence permission (e.g. read-only permission, read/write permission, and/or execute permission).

In this case, it may not be possible to specify the stage-1 top-level entry presence permission independently of the PRO permission. However, other implementations could encode the stage-1 top-level entry presence permission independently from the PRO permission so that the stage-1 top-level entry presence permission could be specified even if the PRO permission is not provided.

Use of these attributes and permissions will be discussed in more detail below. It will be appreciated that not all of these attributes and permissions need to be supported in every possible implementation. While FIG. 8 illustrates an example where the S1 and S2 access permissions are specified directly in the encoding of the translation table entry, it is also possible to specify the same information indirectly using permissions specified in a permissions register. For example, the S1 or S2 permissions field 66, 68 could specify an index value which selects which of a number of permission fields of the permissions register specifies the access permissions for the corresponding translation table entry. It is also possible for some fields of the translation table entries to be interpreted in different ways depending on control state stored in a control register. For example, the protected entry field 76 of a stage-1 translation table entry may be interpreted as indicating whether the stage-1 translation table entry is protected when a control value stored in a control register has a first value, and be interpreted in a different manner when the control value has a second value. Similarly, the anti-aliasing property field 79 of a stage-2 translation table entry may be interpreted as indicating whether the stage-2 translation table entry has the anti-aliasing property when a control value stored in a control register has a first value, and be interpreted in a different manner when the control value has a second value.

Partially-Read-Only Permission

FIG. 9 summarises write access control behaviour for a memory region marked by the stage-2 access permissions 68 as having the partially-read-only (PRO) permission. A memory region having the PRO permission is, at least for write requests issued when the current execution state is EL1 (the state in which operating system code is expected to be executed), writable for a restricted subset of write request types, but treated as read-only for the write request types. As only some write request types see the memory region as read-only, this permission is therefore described as a partially read-only permission.

FIG. 9 summarises the types of write requests permitted and prohibited to write to a memory region for which the corresponding stage-2 translation table entry defines the region as having the PRO permission. The restricted subset of write request types permitted to write to a PRO region when the write is issued at EL1 includes the metadata-updating write requests generated by the MMU 28 to update the access tracking metadata in a translation table entry, such as the access flag 70 or the write permission in the case when the dirty bit modifier 72 is set, as discussed above. Also, the restricted subset can include at least one predetermined type of translation table entry updating instruction executed at exception state EL1, which can be a dedicated type of instruction intended for use in updating translation table entries, to express the intent of the program code to distinguish such writes for updating translation table entries from writes for updating data other than translation table entries. For example, the predetermined type of translation table entry updating instruction could include the variants of the protected-entry-checking read-check-write (RCW) instruction discussed with respect to FIGS. 12 to 14 below. As shown in FIG. 9, a write request issued in response to at least one other type of store instruction executed in one of exception states EL0 and EL1 is prohibited from writing to a PRO region of memory. For example, the prohibited write request types may include the majority of store instructions in the instruction set architecture supported by the processing circuitry 4. By restricting the ability to update translation table entries to a limited set of instruction types when the region is marked with the PRO permission, this reduces the attack surface available for an attacker to exploit when attempting to corrupt stage-1 translation table entries, as for example, tampering with the address operand for a general-purpose store which is not one of the restricted subset of write requests will not allow access to the PRO region of memory.

Optionally, write requests issued in response to a store instruction executed in one of execution states EL2 or EL3 may be permitted to write to a partially read-only region, even if they are a type of store instruction which would have been prohibited to write that region if executed at execution state EL0 or EL1. However, this is not essential as mentioned earlier.

Figure 10:
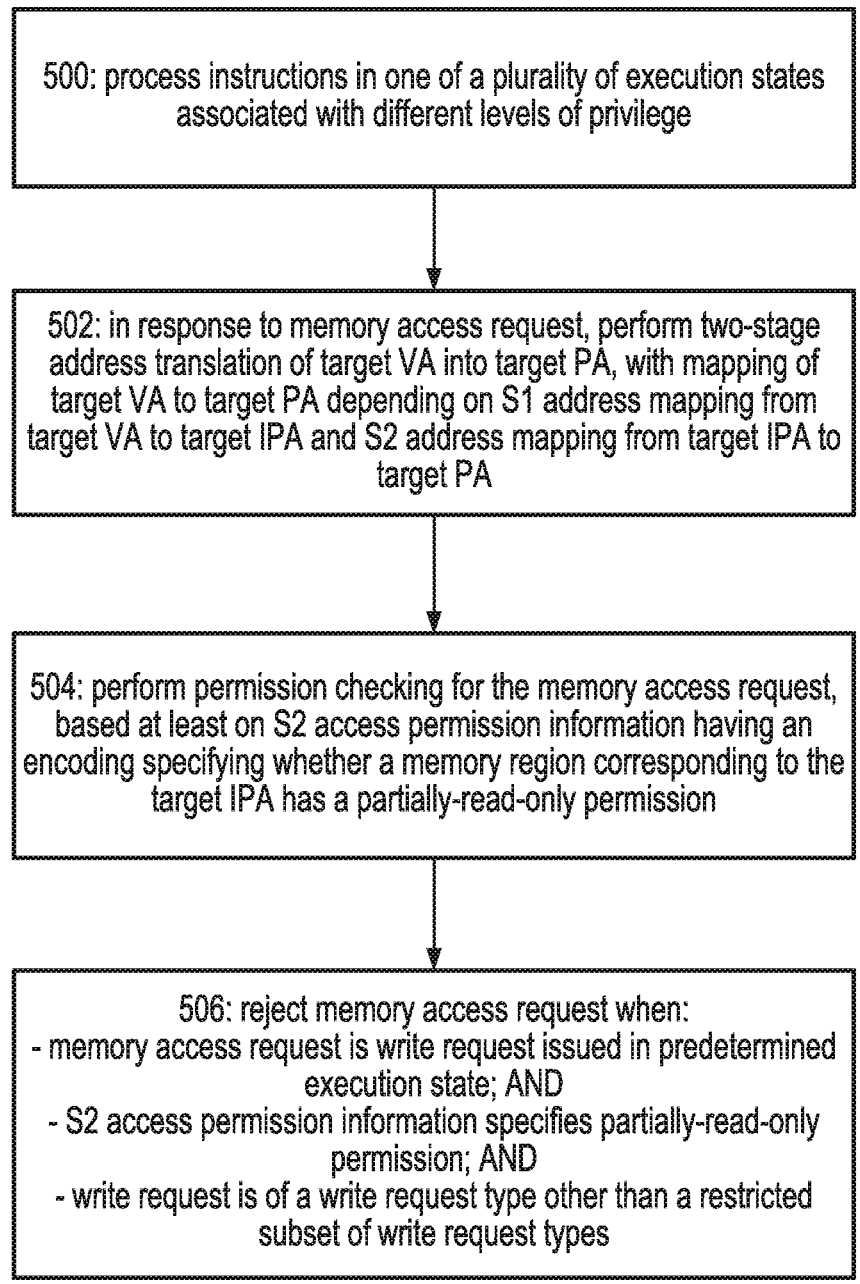
FIG. 10 illustrates a method for performing address translation and permission checking.

FIG. 10 is a flow diagram illustrating a method of processing instructions and controlling memory management operations. At step 500 the processing circuitry 4 processes instructions in one of a number of execution states EL0-EL3 associated with different levels of privilege. At step 502, in response to a memory access request, the MMU 28 performs two-stage address translation of a target virtual address (VA) specified by the memory access request into a target physical address (PA), with the mapping of the target VA to the target PA depending on a stage-1 address mapping from the target VA to a target intermediate address (IPA) and stage-2 address mapping from the target IPA to the target PA. At step 504, the access control circuitry 50 of the MMU 28 performs permission checking for the memory access request, based at least on the stage-2 access permission information 68 specified in a corresponding stage-2 translation table entry. The permission checking can also be based on the stage-1 access permission information 66. The stage-2 access permission information 66 has an encoding specify whether a memory region corresponding to the target IPA has the PRO permission. At step 506, the MMU 28 rejects the memory access request when the memory access request is a write request issued in a predetermined execution state (e.g. EL1), the stage-2 access permission information does specify the PRO permission, and the write request is of a write request type other than the restricted subset of write request types allowed to write to PRO regions of memory. Optionally, the MMU 28 could also reject the memory access requests when it is a write request issued in an execution state (e.g. EL0) other than the predetermined execution state when the PRO permission is specified by the stage-2 access permission information and the write request type is not one of the restricted subset of write request types.

Figure 11:
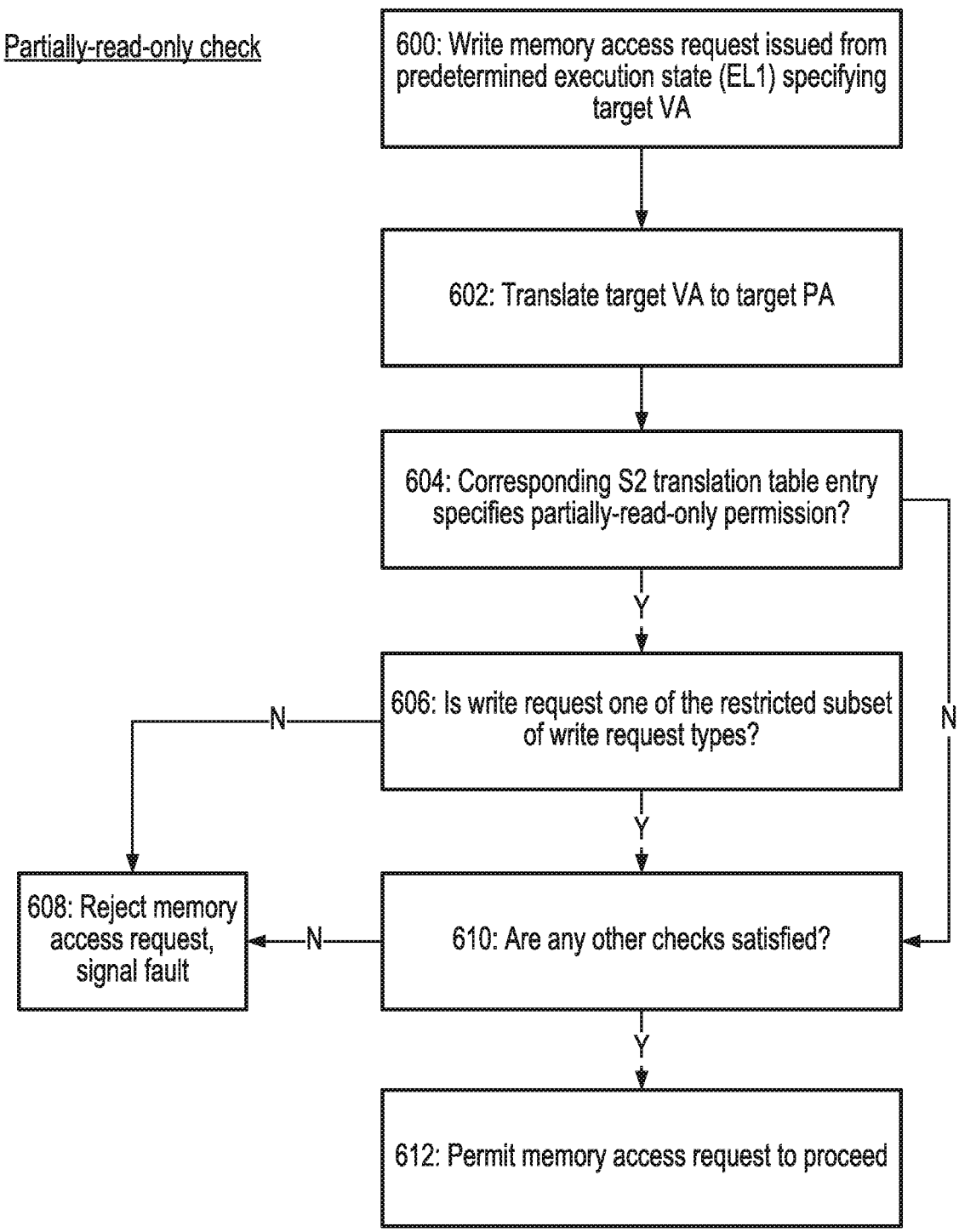
FIG. 11 is a flow diagram illustrating a check based on a partially-read-only permission.

FIG. 11 illustrates in more detail the partially-read-only check performed by the access control circuitry 50 of the MMU 28. At step 600, a write memory access request is issued when the processing circuitry 4 is in the predetermined execution state (EL1). The write request specifies a target VA. The write request could have been issued by the load/store unit 26 of the processing circuitry 4 in response to a load/store instruction executed by the processing circuitry, or by the fetch stage 6 when requesting an instruction fetch. The write request could also be a metadata-updating write request issued by the MMU 28 to update access tracking metadata in translation table entries during a translation table walk process.

At step 602 the target VA is translated into the target PA identifying the memory system location to be accessed. To perform the translation, the MMU 28 can look up the target VA within the TLBs 29 and if a mapping from the target VA to the target PA is already available in the TLBs 29 then no translation table walk is necessary. Otherwise, at least part of the translation table walk process shown in FIG. 6 may be needed, although some parts may be able to be skipped if information derived from the corresponding translation table entries for that part of the translation table walk is already cached in the TLBs 29. For write memory access requests issued from non-secure EL1, the translation is performed as a two-stage address translation based on the mappings defined in both the stage-1 and stage-2 translation tables, although this does not necessarily mean that two separate translations need to be performed, as it is possible for a combined stage 1/stage 2 TLB to be provided which caches mappings direct from target VA to target PA (depending on both the stage-1 and stage-2 mappings), along with the corresponding stage-1 and stage-2 permissions information, to avoid the target IPA needing to be determined explicitly.

At step 604 the access control circuitry checks whether the corresponding stage-2 (S2) translation table entry (the stage-2 entry which specifies the mapping from the target IPA to the target PA) specifies the PRO permission. If so, then at step 606 the access control circuitry checks whether the write request being processed is one of the restricted subset of write request types. If the current write request is not one of the restricted subset of write request types (including at least the metadata-updating write request), then at step 608 the memory access request is rejected and a fault is signalled. If the write request is one of the restricted subset of write request types then the partially-read-only check is passed and so the method proceeds to step 610. Also, if at step 604 the corresponding stage-2 translation table entry did not specify the PRO permission, then the partially read-only check at step 606 can be omitted and so the method proceeds from step 604 direct to step 610.

At step 610 the access control circuitry determines whether any other checks, required to allow the write memory access request to proceed, are satisfied. For example, these checks could include checks using the stage-1 access permissions 66, checks using other stage-2 access permissions 68 in the case when the PRO permission is not specified, security checks based on whether the request was issued from the secure or non-secure state (in implementations which support the secure state) as well as other checks specific to particular instruction types, such as the checks discussed below with respect to FIGS. 12 to 14 regarding whether data at the target memory location is a protected translation table entry. If any of these other checks are not satisfied then again at step 608 the memory access request is rejected and a fault is signalled. Fault syndrome information may be set to distinguish the cause of the fault. If the checks performed at step 610 are satisfied then at step 612 the memory access request can be permitted to proceed and so the memory system location associated with the target PA can be updated with the write data specified by the write request.

Hence, as shown in FIG. 6 discussed earlier, the PRO permission may be specified in the stage-2 access permissions 68 of the stage-2 translation table entries which are used to provide the physical address of the memory system location holding the various levels of stage-1 translation tables used in the traverse of the stage-1 table structure to obtain the intermediate address of a memory region containing sensitive information. This protects those stage-1 translation entries against corruption by erroneously functioning code or operating system code under attack by a malicious party, since the PRO permission restricts the ability to write to the corresponding memory regions to a limited subset of instruction types, greatly reducing the number of lines of code which can be vulnerable to corruption of the stage-1 translation tables. Nevertheless, hardware-generated write requests for updating access tracking metadata in translation table entries can still be permitted for such regions to avoid compromising the efficiency of paging operations by the operating system.

While FIG. 11 shows the partially read-only check being performed for a write memory access request issued when in the predetermined execution state EL1, it could also be performed for other execution states. However, this may not be essential since for write requests issued in the least privileged execution state EL0, it is likely that the memory regions holding the stage-1 translation tables will in any case be marked by the stage-1 access permissions 66 as being inaccessible to application-level code operating at EL0, so stage-1 permissions checks may already prevent such write requests corrupting stage-1 translation tables. Also, for code executing at EL2 or EL3 the translation tables would not use two-stage address translation and are unlikely to restrict writes to a region storing a stage-1 translation table entry since the hypervisor or monitor code may be the code which is controlling the restrictions on which updates to stage-1 translation tables are allowed. Therefore, some implementations may restrict the partially-read-only check to be performed only when the current execution state is EL1. Other implementations may apply the partially-read-only check regardless of which execution state is the current execution state.

Protected-Entry Encoding for Stage-1 Translation Table Entries

The use of the PRO permission to mark certain memory regions as read-only for write requests other than a restricted subset of write types is helpful to protect the stage-1 tables against corruption. However, as shown in FIG. 6, typically a given translation table at a given level of the translation table structure occupies a whole page in memory, and so the PRO permission would apply to the entire translation table at a given level of the stage-1 translation table structure, which may include translation table entries for a variety of memory regions which may include some memory regions used for sensitive information which need to be protected against unauthorised access, and other memory regions which only contain non-sensitive information which does not require this protection.

It is possible to provide an implementation which does not support the use of protected-entry encodings for stage-1 translation table entries as discussed further below. In this case, to allow the operating system to update certain stage-1 translation table entries associated with non-protected regions containing non-sensitive information, the fault generated on a write access to a PRO region which is not one of the write request types allowed to write to the PRO region could cause a trap to the hypervisor operating at EL2, and the hypervisor could then determine in software whether the region for which the operating system wishes to update the stage-1 translation table entry should be protected against being updated by the operating system, and if the region does not need to be protected, the update requested by the operating system can be allowed to proceed. However, in practice the operating system may need to change translation table entries for non-protected regions of memory relatively frequently, and so trapping to the hypervisor each time an update is required may be slow in terms of performance.

The protected-entry encoding (e.g. using bits 76, 78) for stage-1 translation table entries helps to allow the operating system to make updates to non-protected entries without hypervisor intervention (and, optionally for some implementations, to make updates to non-update-restricted bits of protected entries without hypervisor intervention). This helps improve performance because hypervisor involvement can be avoided more often, even when a given stage-1 translation table is stored in a PRO region of memory because it contains a mixture of protected entries and non-protected entries. The instruction decoder 10 and execute stage 16 of the processing circuitry 4 support at least one type of instruction, called a protected-entry-checking type of read-check-write (RCW) instruction, which can be used to request an update to a given memory system location where the update is made conditional on a protected entry check, which checks the data stored at the accessed memory system location to check whether it has a value consistent with an encoding of a protected stage-1 translation table entry. If it is found that the data at the accessed memory system location has a value consistent with the data being a protected stage-1 translation table entry, then updates to at least an update-restricted subset of bits of the given memory system location are suppressed. The RCW instruction is allowed to be executed by the operating system executing at EL1. The RCW instruction is one of the restricted subset of instructions allowed to update data in memory regions marked with the PRO permission by the corresponding stage-2 translation table entry.

The protected entry check is performed in hardware by the protected-entry-checking circuitry 54, which as shown in FIG. 7 can be implemented either within the MMU 28, or closer to the memory system location storing the data, for example within a memory system component 56 such as a cache, interconnect or memory controller. It is also possible to use a distributed set of logic with some parts of the protected-entry-checking circuitry 54 implemented in the MMU 28 (or the execute stage 16 of the pipeline) and other parts implemented closer to memory storage. The read, check and write operations performed in the protected entry check are performed as an atomic (indivisible) operation, so that when access is requested to the given memory system location by another thread executing on the same processor circuitry as the thread executing the RCW instruction or by another processor core, the other access sees either the value of the given memory system location prior to processing the RCW instruction, or the value of the given memory system location after processing the RCW instruction, not any partial effect of the RCW instruction, and also it is not possible for a write to the given memory system location to update the given memory system location in the period between the protected entry check reading the data at the given memory system location and the subsequent updating of the data at the given memory system location in response to the RCW instruction. Any known technique for enforcing atomic read/write operations to a memory system location can be used to enforce the atomicity (e.g. locking the memory location against access by other operations in the period between the read and the write, or allowing a conflicting access in that period but restarting the RCW operation if a conflicting access is detected in the period between the read and write). By enforcing atomicity of the read, check and write, this avoids race conditions which could lead to incorrect processing results. As the read, check and write operations are performed atomically, it can be useful for the protected-entry-checking circuitry 54 to be implemented within a memory system component 56 closer to the storage location being updated, to reduce the duration of the period between the read and the write compared to the duration if the read data has to be returned all the way up to the MMU 28 or another element of the processor pipeline 4 for the check to be performed before the write can proceed and return the write data to the memory system location storing the data.

In the example shown in FIG. 8, both valid and invalid stage-1 translation table entries have an encoding allowing the entry to be specified as a protected entry. However, it is not essential for invalid entries to be capable of being specified as protected, and other examples could omit the protected entry encoding bitfield 78 from the invalid entry format. Also, different implementations may choose different options for how many bits of a protected entry have their update suppressed in response the RCW instruction. Some implementations could prevent any updates to a protected entry in response the RCW instruction, with updates only be permitted in response the RCW instruction if the data at the given memory system location is not encoded as a protected entry. Other implementations could specify an update-restricted subset of bits and a non-update-restricted subset of bits, and so updates to the non-update-restricted subset of bits may be allowable even for protected entries. For example, there may be some fields which are not critical to security, such as the access flag 70 and dirty bit modifier 72, which could be allowed to be updated even in a protected entry. Which bits are update-restricted or non-update-restricted could either be fixed in a non-programmable manner for a given architecture, or could be programmable by software using a selection value stored in a control register. For example, the selection value could select from one of several different modes, each mode associated with a different setting for which bits are update-restricted. However, in the example of FIG. 7 the selection value is encoded as a bit mask which identifies the positions of the update-restricted bits, with the selection value stored in a mask register (e.g. the RCWMask_Valid_EL2 and RCWMask_Invalid_EL2 registers shown in FIG. 7 for selecting the update-restricted bits for valid and invalid entries respectively—the RCW_Mask_Invalid_EL2 register could be omitted in implementations where invalid entries are not capable of being encoded as protected entries). Updates to the selection value may be restricted to program instructions executing at a threshold privilege level or higher, for example only instructions executing at EL2 or EL3 may be allowed to update the selection value. There may be some bits which are forced to be update-restricted, regardless of the state of the selection value. For example, the bitfield 76, 78 used to encode whether the entry is a protected entry may not be allowed to be updated regardless of which other bits are able to be updated. In general, the RCW instruction may be prohibited from changing the status of whether a particular entry is protected or non-protected. The setting of the bitfield 76, 78 would instead be controlled by program code executing at a higher level of privilege, such as EL2 or EL3, which may be accessing memory using a different set of stage-2 translation tables which does not mark the memory region storing the protected entry as partially read-only, and so can set the bitfield 76, 78 of the protected stage-1 entry using a standard general purpose store instruction.

There are a variety of ways in which the protected-entry check could be implemented. In one example, if the entry stored at the accessed memory system location is valid and protected, then it cannot be altered, and if it is invalid then it can be altered, including making it valid (so long as the entry is not also made protected). Alternatively, there could be a protected bitfield 76 in the valid entry, and a protected bitfield 78 in the invalid entry, and no changes to protected entries may be allowed, otherwise updates are allowed to non-protected (valid or invalid) entries other than (changing the status of whether the entry is protected). Another example could provide a protected bitfield 76 in the valid entry, and a protected bitfield 78 in the invalid entry, and the RCW instruction may be allowed to make any changes to the entry if not protected (other than making it protected), while if it is protected then the RCW instruction can make changes to some bits as described for a valid entry, and to some bits in an invalid entry. In some examples, the mechanism for describing which bits are protected is a hardwired architectural choice of any field except the protection or valid fields. Alternatively, the mechanism for describing which bits are protected in the valid entry could use a mask register owned by EL2, and/or the mechanism for describing which bits are protected in the invalid entry is a mask register owned by the EL2. Different choices for defining the update-restricted bits are possible for valid and invalid entries respectively—e.g. one approach could be to define a mask register for defining the update-restricted bits of the valid entry, but hardwire the update-restricted bits for the invalid entry.

There can also be variation in how to apply the check when it is allowed to update some fields in a protected entry, two example options being:
A) The protected-entry-checking circuitry 54 reads the current entry to check if the entry is valid and/or protected, and then stores only the bits that are allowed to be written (without checking if the RCW instruction was attempting to change the update-restricted bits that are not allowed to be written).
B) The protected-entry-checking circuitry 54 reads the current entry to check if the entry is valid and/or protected. If it is protected, and the RCW instruction is not attempting to change any bits that are not allowed to be written, the write can take place, but if the RCW instruction attempts to update any update-restricted bit, the write fails and nothing is written.

Both A and B are viable alternatives.

In response to the RCW instruction, an indication of whether the write was successful or failed can be written to condition status flags stored in a control register of the processing circuitry 4. For example, condition status register may include a number of condition flags (e.g. a negative flag N, zero flag Z, carry flag C and overflow flag V) which can be set depending on the outcome of a processing operation and can be tested by a conditional instruction which may then trigger an operation (such as a branch operation or arithmetic/logical operation) conditionally depending on the state of the condition status flags. Hence, it can be useful to update the condition status flags based on whether any part of the write requested by the RCW instruction was unsuccessful, to allow a subsequent instruction to take action depending on the outcome of the write without needing to re-read the memory system location to check whether the write was successful.

Figure 12:
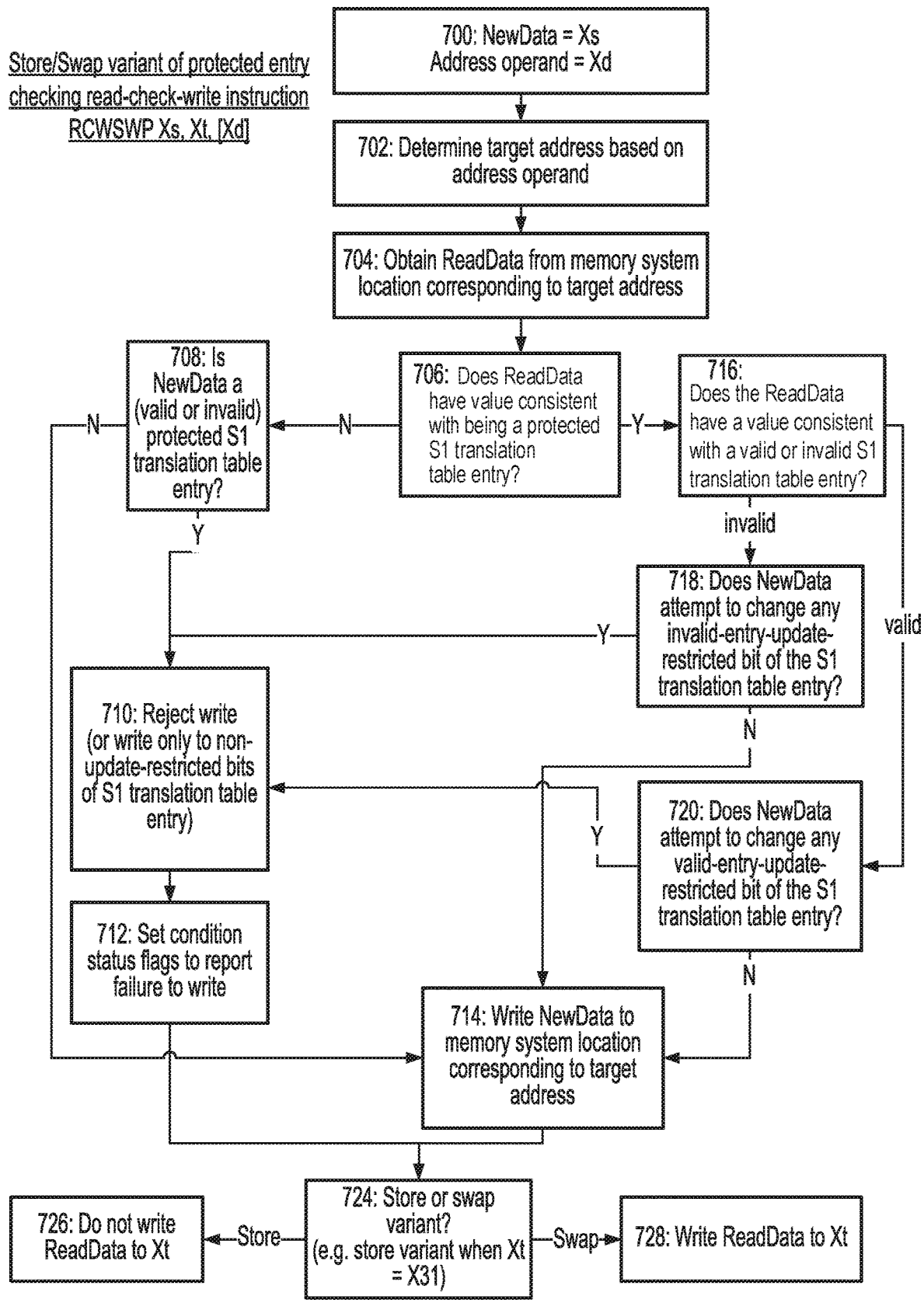
FIGS. 12, 13 and 14 illustrate processing of different variants of a protected-entry-checking type of read-check-write instruction.
Figure 13:
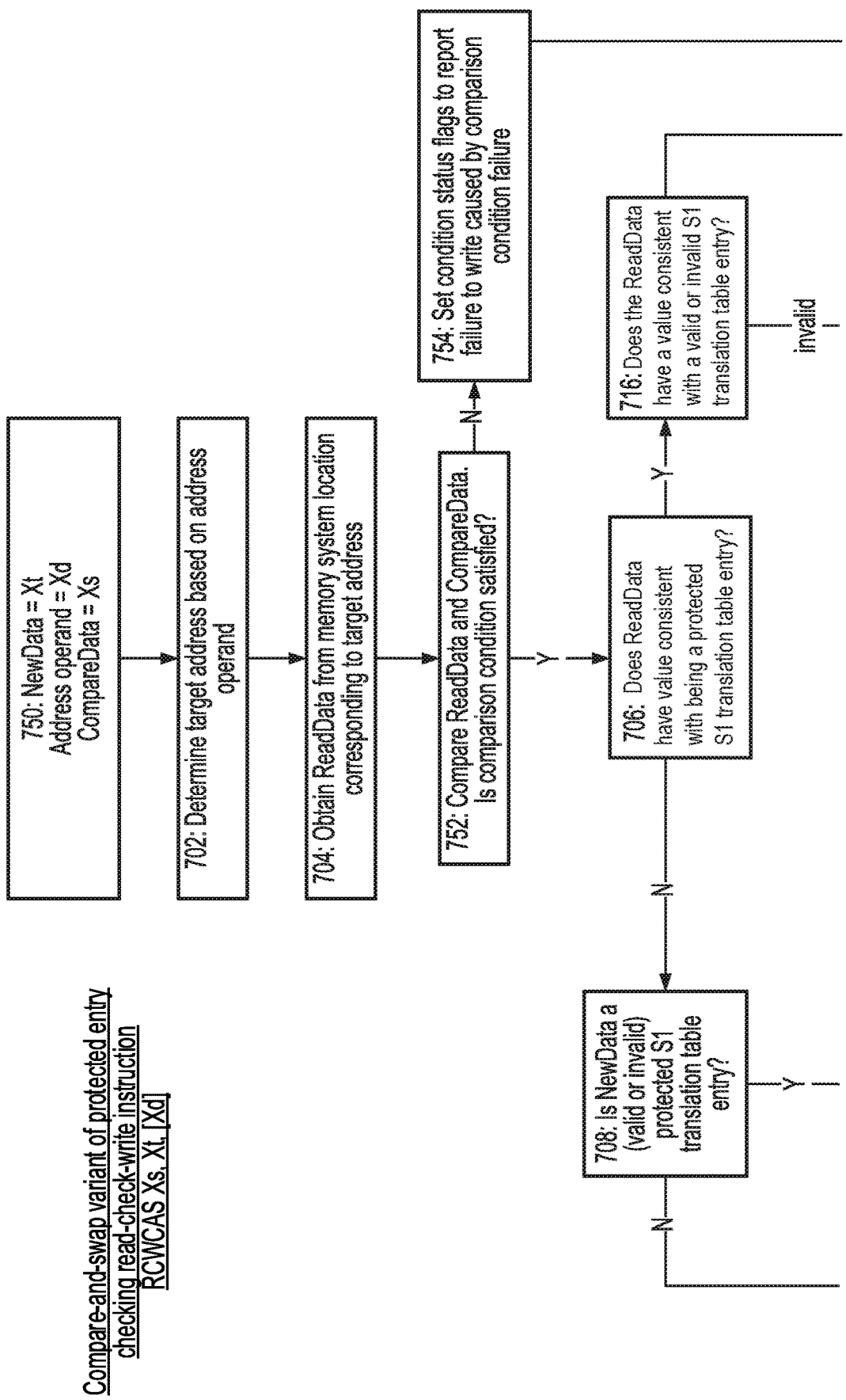
Figure 13:
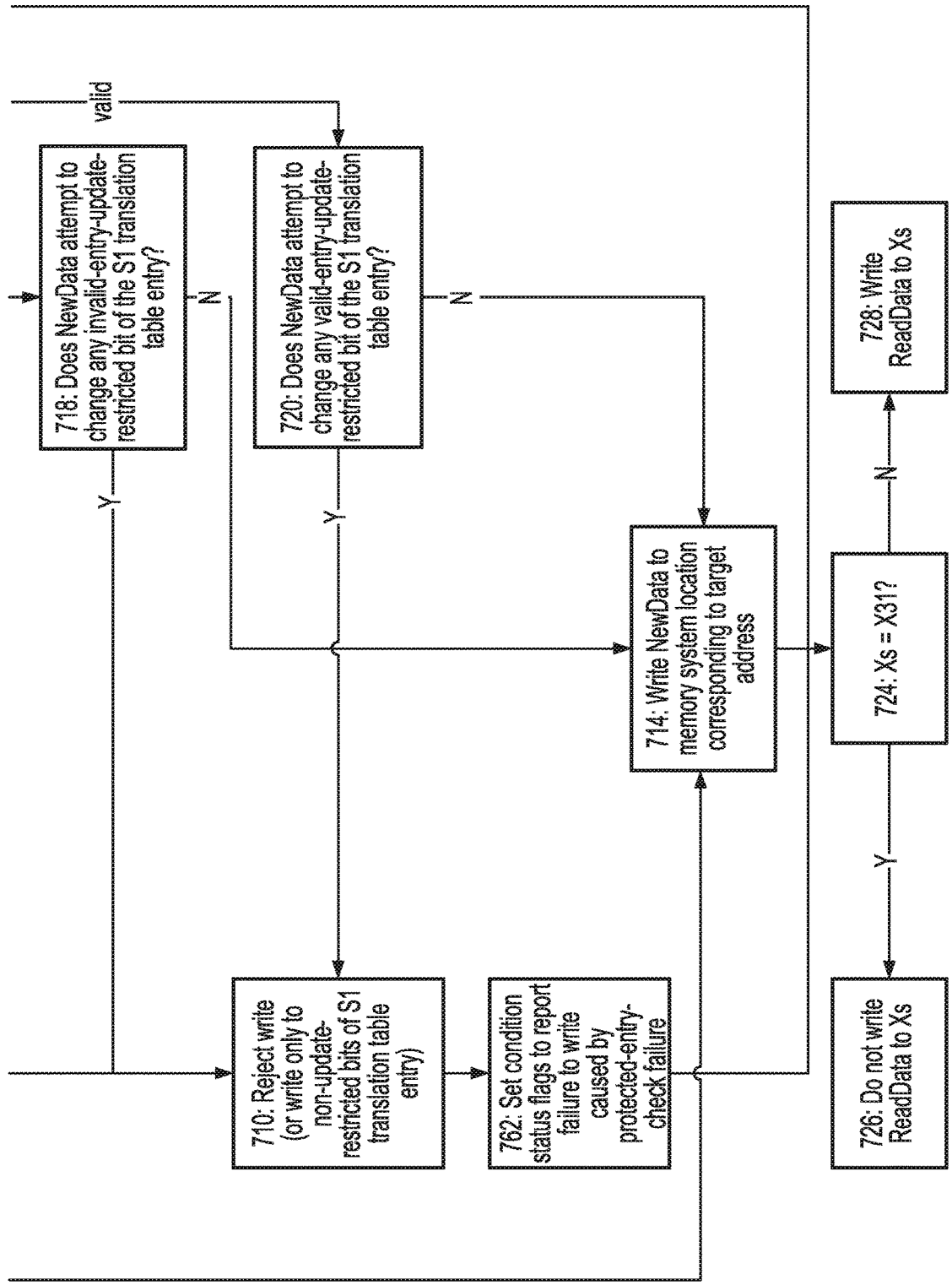
Figure 14:
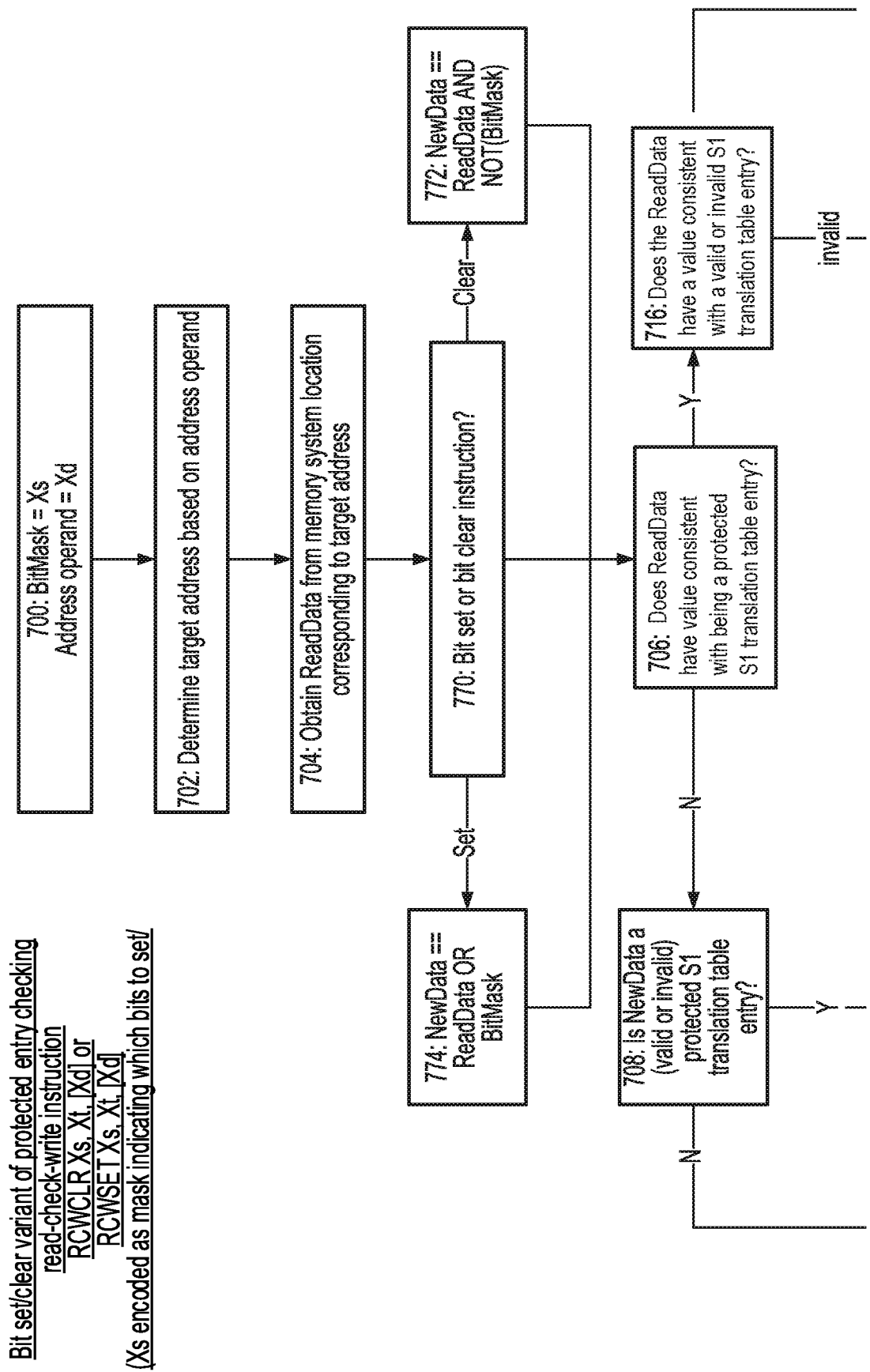
Figure 14:
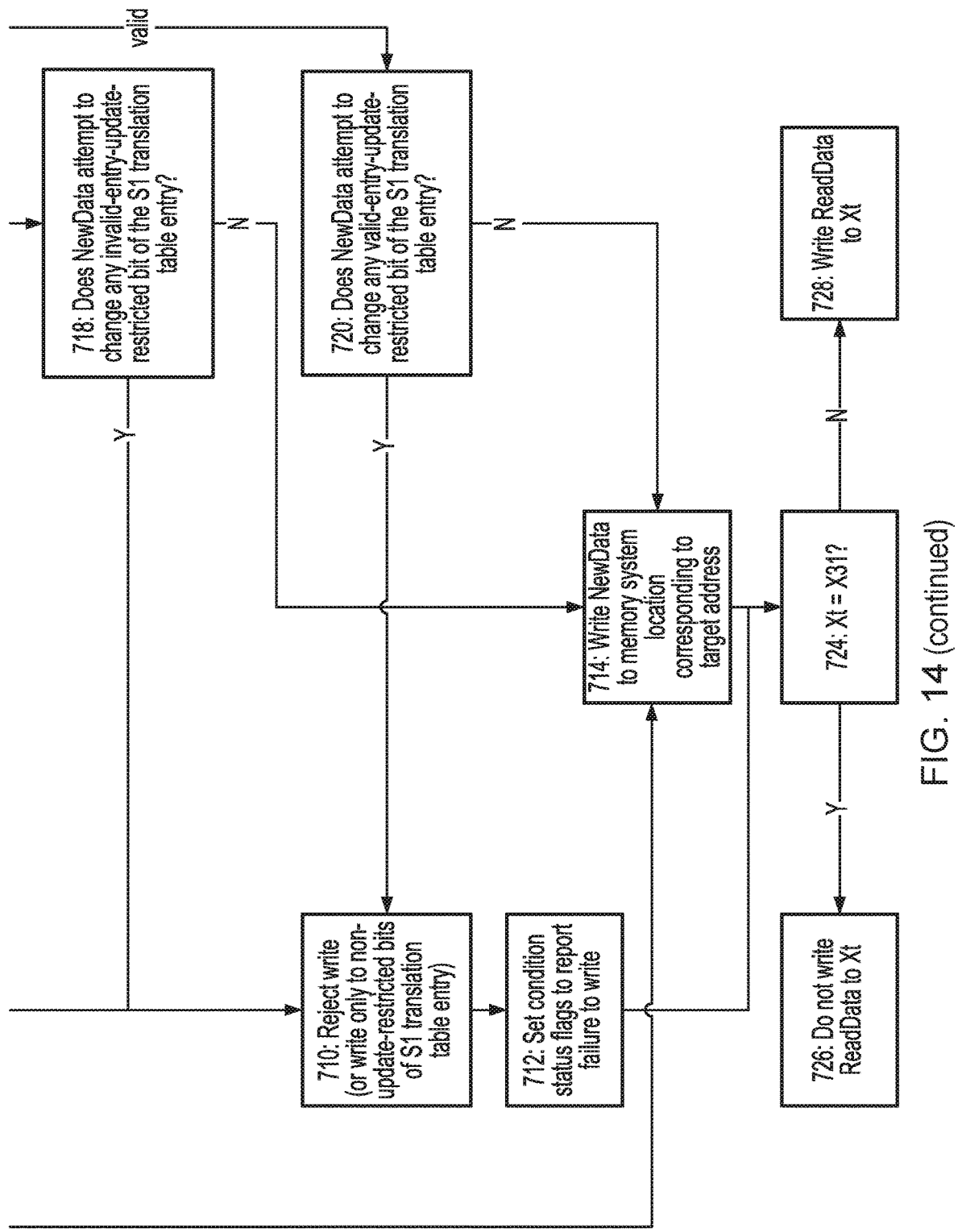

FIGS. 12, 13 and 14 illustrate processing of a number of variants of the protected-entry-checking RCW instruction. FIG. 12 illustrates an example of processing of either a store variant or a swap variant of the instruction (the majority of processing steps being the same for both instructions, other than the final step 726 or 728 which depends on the variant). The store and swap variants both specify a register Xd which provides an address operand used to generate an address of the given memory system location to be updated, and a source register Xs which provides the new data to be written to the given memory system location. At least the swap variant also specifies a destination register Xt to which the old data read from the given memory system location is to be written. The store variant does not need to specify any destination register as the store variant differs from the swap variant in that the old data is not written to any destination register. However, in one example the store variant and the swap variant could be encoded using an identical encoding, except that the instruction may be treated as the store variant when the field used to specify the destination register Xt has a predetermined value. For example, some instruction set architectures may define a particular register specifier (e.g. register 31) as corresponding to a "zero" register which when specified as an operand for an instruction causes the operand to be treated as if it has the value zero, without needing the operand to actually be read from a register provided in hardware. Hence, in some examples, the instruction could be treated as the store variant when the destination register Xt is specified as the "zero" register X31. In other examples, the store instruction could be encoded as a completely different instruction type to the swap instruction.

At step 700 of FIG. 12, the address operand and new data ("NewData") to be written are read from the registers identified by register specifiers Xd and Xs respectively. At step 702, the target address for the memory access is determined based on the address operand. For example the address operand could be treated as an absolute address directly specifying the target address, or could define offset relative to a reference address such as a value in a further base register or the program counter value identifying the address of the RCW instruction itself. The target address computed based on the address operand is a virtual address and may be translated into a physical address by the MMU 28. At step 704, assuming any MMU checks (other than the protected entry check) for whether the target address is accessible to the current instruction are passed, a read request is issued to the memory system to obtain the data ("ReadData") read from the memory system location corresponding to the (translated) target address. This corresponds to the "Read" of the RCW instruction.

As step 706 the protected-entry-checking circuitry 54 determines whether the ReadData has a value consistent with encoding of a protected stage-1 (S1) translation table entry. This corresponds to the "Check" part of the RCW instruction. If the ReadData does not have a value consistent with being a protected stage-1 translation table entry, then at step 708 the protected-entry-checking circuitry checks whether the NewData is encoded as a protected stage-1 translation table entry. If so, then at step 710 the write requested by the RCW instruction is rejected, or alternatively the non-update-restricted bits of the stage-1 translation table entry specified as the NewData by the RCW instruction can be written to the corresponding bits of the memory system location, with at least the bits used to encode whether the entry is protected being considered update-restricted bits which are not written. Either way, at step 712 the condition status flags are set to report the failure to carry out the write requested by the RCW instruction fully.

If at step 706 the ReadData was determined to be encoded as a protected stage-1 translation table entry then at step 716 the protected-entry-checking circuitry 54 determines whether the read data has a value consistent with being a valid or invalid stage-1 translation table entry. If the read data has a value consistent with being an invalid protected stage-1 translation table entry, then at step 718 the protected-entry-checking circuitry 54 determines whether the New-Data attempts to change any invalid-entry-update-restricted bits of the stage-1 translation table entry (including at least any bits used to encode whether the entry is protected), and if so then again the method proceeds to step 710 and 712 to suppress the update of at least the invalid-entry-update-restricted bits and set the condition status flags (again, this could be done either by rejecting the write entirely or by writing only to non-update-restricted bits).

On the other hand, if at step 716 it is determined that the ReadData has a value consistent with being a valid stage-1 translation table entry encoded as a protected entry, then at step 720 the protected-entry-checking circuitry 54 determines whether the NewData attempts to change any valid-entry-update-restricted bits (including at least any bits used to encode whether the entry is protected) of the stage-1 translation table entry read from the memory system location corresponding to the target address. If so, then again at step 710 the write is rejected or permitted only to write the non-update-restricted bits, and at step 712 the condition status flags are set to report the failure of the write.

In implementations which do not support invalid translation table entries being encoded as protected entries, steps 716 and 718 can be omitted and the method can proceed direct from step 706 to step 720 in the case when the ReadData is encoded as a protected entry.

If at step 708 the NewData to be written in the case when the ReadData was not a protected entry, or at steps 718 or 720 the NewData (to be written in the case when the ReadData was a protected entry) does not attempt to change any update-restricted bits, then at step 714 the write of the RCW instruction is permitted, and so the NewData is written to the memory system location corresponding to the target address.

Regardless of whether the write was successful or rejected (at least partially), at step 724 the operation varies depending on whether the current RCW instruction being executed is the store variant or the swap variant. If the instruction is the store variant then at step 726 no further action is needed and the ReadData is not written to any destination register. If the instruction is the swap variant then at step 728 the ReadData is written to the destination register Xt. Some implementations may not support both the store and stop variants, in which case step 724 can be omitted and the method can proceed direct from step 714 to the relevant one of steps 726 and 728.

The read at step 704, write at step 714 and the various checking operations performed between steps 704 and 714 are performed atomically, as an indivisible set of operations for which it is not possible for an intervening write to the memory system location to take place between the read at step 704 and the write at steps 710 or 714, or for another thread of execution to see a partial outcome of performing the set of operations.

Some example pseudocode for representing the functionality of the store/swap variants of the RCW instruction is shown below. It will be appreciated that this is just one example and is more specific than the more general representation shown in FIG. 12. For example, the pseudocode assumes that the selection of update-restricted bits for both valid and invalid protected entries is defined in corresponding mask registers, but as discussed above this is not essential and other examples could hardwire the selection of which bits are update-restricted, or consider all bits of a protected entry to be update-restricted. In this example, a failure to write is reported by setting the "zero" flag Z of the condition status flags to 1. Other examples could choose a different condition state to encode the failure to write. It will be appreciated that the functionality shown below in pseudocode can be implemented using hardware circuit logic in the protected-entry-checking circuitry 54 described above, so the pseudocode is intended to show the logical functionality of the circuit logic, rather than implying software carries out these functions.

```
bits(4) pstate_bits = "0000";
NewData = X[s];
Address = X[d];
ReadData<63:0> = Mem[Address];
protected = ReadData<0> == '1' ? ReadData<Valid_Protected_Bitpos>:
ReadData<Invalid_Protected_Bitpos>;
if protected == '0' then
    new_protected = NewData<0> == '1' ? NewData<Valid_Protected_Bitpos>:
    NewData<Invalid_Protected_Bitpos>;
    if new_protected == '0' then // can't change the protected field
        Mem[Address] = NewData;
    else
        pstate_bits="0100"; // Z bit set on failure to write
else
    if ReadData<0> == '0' then // invalid entry
        if NewData<Invalid_Protected_Bitpos> == '0' && NewData<0> == '0'
        then // can't change valid or protected
            Mem[Address] = NewData;
        else
            pstate_bits="0100"; // Z bit set on failure to write
    else
        if (NewData^ReadData) & ~RCWMask_EL2 == Zeros(64) then
            Mem[Address] = NewData;
        else
            pstate_bits = "0100" ; // Z bit set on failure to write
PSTATE.NZCV = pstate_bits;
X[t] = ReadData; // return the old value
```

FIG. 13 is a flow diagram illustrating processing of a compare-and-swap (CAS) variant of the protected-entry-checking RCW instruction. The steps of FIG. 13 illustrated with the same reference numerals as in FIG. 12 are the same as discussed above. Note that the notation used for the registers used to store the ReadData and provide the NewData has been swapped in FIG. 13 compared to FIG. 12—Xt now being the register providing the NewData and Xs being the destination register written with the old value of the ReadData prior to the write. FIG. 13 differs from FIG. 12 in that step 700 is replaced with step 750 as the CAS variant specifies an additional source operand, called the compare data ("CompareData"). In this example, to reduce the number of register fields needed in the instruction encoding, the CompareData is specified in the same register Xs used as the destination register for writing the ReadData at step 728, but this is not essential and other examples could specify the compare data in a further register separate from Xs.

Steps 702 and 704 are the same as in FIG. 12. After step 704, an additional step 752 is performed to compare the ReadData read from the given memory system location corresponding to the target address and the CompareData specified by the RCW instruction in register Xs. The protected-entry-checking circuitry 54 determines, based on the comparison, whether a comparison condition is satisfied. For example, the comparison condition could be whether the CompareData and ReadData are equal, or could be based on another comparison condition such as less than, greater than, not-equal, etc. Some implementations may fix the comparison condition as being an equals condition, while other implementations could allow a parameter of the instruction to select which type of comparison to perform. If the comparison condition is not satisfied, then at step 754 the write requested by the RCW instruction is rejected and the condition status flags are set to report the failure to write being caused by the comparison condition failure (e.g. setting the negative flag N on a comparison condition failure). If the comparison condition is satisfied then steps 706, 708, 710, 714, 716, 718, 720 are performed in the same way as in FIG. 12 to check the protected entry status of the data read from the memory system location corresponding the target address and controlling whether the write is permitted based on the outcome of the check. If the write is permitted then step 714 is the same as discussed earlier to allow the write to proceed to write the NewData to the memory system location. If the write is rejected or only partially performed at step 710, then the subsequent step 712 of FIG. 12 is replaced with step 762 of FIG. 13, which is the same in that it sets the condition status flags to report the failure to write, but in the case of the compare and swap variant this may distinguish that the failure was caused by a protected-entry-check failure, setting the condition status flags to a different value to the value used at step 754 in the case of a comparison condition failure.

Regardless of whether or not either the comparison condition is satisfied or the protected-entry checks are successful, steps 724, 726 and 728 are the same as in FIG. 12 to optionally write the ReadData to the destination register Xs (again it is possible to suppress the update of the destination register Xs when the destination register specifier specifies a predetermined value, e.g. 31).

A pseudocode example showing one possible implementation for the functionality of the CAS variant of the RCW instruction is shown below:

```
bits(4) pstate_bits = "0000";
NewData = X[t];
CompData =X[s];
Address = X[d];
```

```
ReadData<63:0> = Mem[Address];
if ReadData == CompData then
    protected = ReadData<0> == '1' ? ReadData<Valid_Protected_Bitpos>:
        ReadData<Invalid_Protected_Bitpos>;
    if protected == '0' then
        new_protected = NewData<0> == '1' ? NewData<Valid_Protected_Bitpos>:
            NewData<Invalid_Protected_Bitpos>;
        if new_protected == '1' then // can't change the protected field
            pstate_bits="0100"; // Z bit set on failure to write
    else
        if ReadData<0> == '0' then // invalid entry
            if NewData<Invalid_Protected_Bitpos> == '1' ||
                NewData<0> == '1' then // can't change valid or protected
                pstate_bits="0100"; // Z bit set on failure to write
            else
                if (NewData^ReadData) & ~RCWMask_EL2 == Zeros(64) then
                    Mem[Address] = NewData;
                else
                    pstate_bits = "0100" ; // Z bit set on failure to write
else
    pstate_bits = "1000"; // new return value on N bit of a CAS failure
PSTATE.NZCV = pstate_bits;
X[s] = ReadData; // return the old value.
```

This pseudocode example shows a case where the comparison condition evaluation takes precedence over the protected entry check, so if the comparison condition fails but also the entry is protected and the checks at steps 708, 718, 720 fail, then the condition status codes would indicate the CAS failure using the N bit. It would also be possible for the protected entry check to take precedence so that if the entry is protected and the checks at steps 708, 718 or 720 fail, then even if the comparison condition would have been failed then the condition status codes would indicate the failure to write due to the protected entry check, using the Z bit. For example, FIG. 13 could be modified to implement steps 752 and 754 after step 714 instead of before step 706.

FIG. 14 is a flow diagram illustrating processing of a bit set/clear variant of the protected-entry-checking RCW instruction. In FIG. 14, steps 700-728 are the same as in FIG. 12, except that in FIG. 14 the NewData, rather than being specified directly in a source register, is calculated based on a bit mask ("BitMask") provided in the source register Xs which encodes the positions of the bits to be set or cleared within the addressed memory system location. Hence, the only differences relative to FIG. 12 are that at step 700 the register Xs defines the BitMask rather than specifying the NewData directly, and that between steps 704 and 706 additional steps 770, 772, 774 are performed. At step 770 the method differs depending on whether a bit set or bit clear instruction is being executed (it is not necessary to support both types of instruction, so if only one of these instructions is supported then step 770 could be omitted and the relevant one of steps 772, 774 performed after step 704). If a bit set instruction is being executed then at step 774 the NewData is set to the result of performing a bitwise OR operation on the ReadData read from the addressed memory system location and the BitMask specified by the RCW instruction (hence, for the bit set instruction the bit positions marked with a '1' in the BitMask are requested to be set to 1 within the addressed memory system location). In contrast, at step 772 if the bit clear instruction is being executed then the NewData is set to the result of performing a bitwise AND operation on the ReadData and the inverse of the BitMask (hence, for the bit clear instruction the bit positions marked with a '1' in the BitMask are requested to be cleared to 0 within the addressed memory system location). For both the bit set and bit clear variants, the bits of the ReadData corresponding to '0' bits of the BitMask retain their original values in the NewData, so are unchanged by the RCW instruction. Having calculated the NewData at step 772 or 774, the subsequent steps of FIG. 14 are all the same as in FIG. 12.

A pseudocode example showing one possible implementation for the functionality of the bit set/clear variant of the RCW instruction is shown below:

```
bits(4) pstate_bits = "0000";
NewData = X[s];
Address = X[d];
ReadData<63:0> = Mem[Address];
protected = ReadData<0> == '1' ? ReadData<Valid_Protected_Bitpos>:
ReadData<Invalid_Protected_Bitpos>;
NewData = ReadData & ~NewData;//CLR or NewData = ReadData | NewData;//SET
if protected == '0' then
    new_protected = NewData<0> == '1' ? NewData<Valid_Protected_Bitpos>:
    NewData<Invalid_Protected_Bitpos>;
    if new_protected == '0' then // can't change the protected field
        Mem[Address] = NewData;
    else
        pstate_bits="0100"; // Z bit set on failure to write
else
    if ReadData<0> == '0' then // invalid entry
        if NewData<Invalid_Protected_Bitpos> == '0' && NewData<0> == '0'
        then // can't change valid or protected
```

```
            Mem[Address] = NewData;
        else
            pstate_bits="0100"; // Z bit set on failure to write
    else
        if (NewData^ReadData) & ~RCWMask_EL2 == Zeros(64) then
            Mem[Address] = NewData;
        else
            pstate_bits = "0100" ; // Z bit set on failure to write
PSTATE.NZCV = pstate_bits;
X[t] = ReadData; // return the old value
```

For all of the flow diagrams in this application, it will be appreciated that the same functionality could also be implemented in a different sequence, so that while the flow diagrams show a sequential sequence of steps, for any steps that do not depend on each other, it is possible to reorder the steps or perform them at least partially in parallel.

Hence, as shown in FIG. 6, the various stage-1 translation table entries used to traverse the translation table tree structure to reach the intermediate address mapping corresponding to a sensitive memory page (e.g. a page expected to be used for sensitive data or instructions) can be set to have the protected entry encoding. This may be the case even if one of these entries is temporarily set as invalid to prohibit access to the page (e.g. as a result of a paging operation). Meanwhile other entries in the same page tables as the protected entries could be non-protected entries for which updates are less restricted. By supporting the protected entry encoding this makes it possible for a given page table stored in a PRO region of memory to contain a mixture of protected and non-protected entries, with the non-protected entries being able to be updated by operating system code executing at EL1 without hypervisor intervention, by executing the RCW instruction according to any of the variants discussed above, while the protected entries can have tighter restrictions placed on them. Since a dedicated type of instruction (e.g. one or more of the variants of the RCW instruction mentioned above) is provided for triggering the protected-entry checks, and the PRO permission prevents other types of instructions (such as the majority of store instructions) being able to update the PRO region of memory, this avoids the need to carry out the protected entry checks on every write to memory which would be very expensive in terms of performance.

Anti-Aliasing Check

Figure 15:
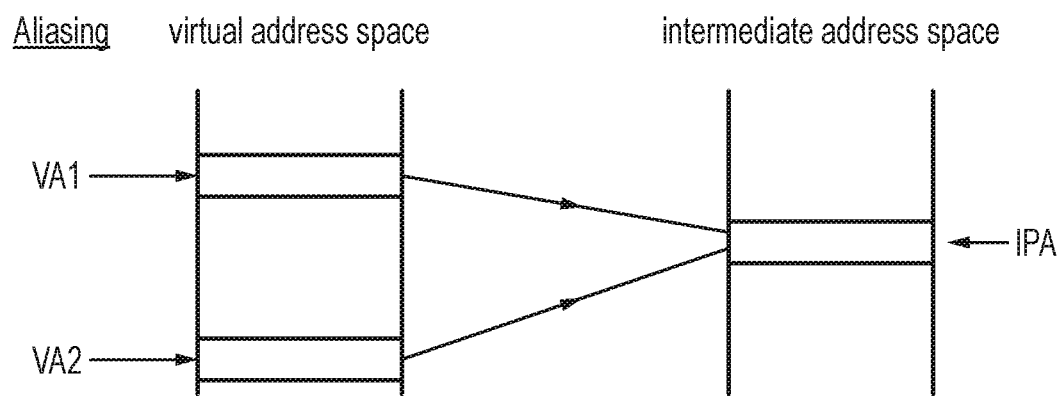
FIG. 15 illustrates aliasing of virtual addresses onto the same intermediate address.

The mechanisms discussed above are useful for protecting a particular stage-1 translation entry against corruption (either deliberately by code hacked by a malicious party or accidentally by poorly written code). However, as shown in FIG. 15 it is possible for several different virtual addresses to alias to the same intermediate address, by defining stage-1 translation table entries specifying the same intermediate address mapping 62. To prevent an attacker being able to circumvent the protections provided by the PRO permission and protected-entry encoding discussed above for a first set of stage-1 translation entries mapping VA1 to IPA, by defining an aliasing stage-1 entry mapping a different virtual address VA2 to the same intermediate address IPA, as shown in FIG. 8 stage-2 translation table entries may have a bitfield 79 specifying whether the corresponding region of memory has an anti-aliasing property. If the region is indicated as having the anti-aliasing property then an additional anti-aliasing check is performed on accesses to that region to check whether all walked stage-1 translation table entries (that would be accessed in a translation table walk to locate the corresponding stage-1 translation table entry specifying the stage-1 address mapping from the virtual address to the physical address for that region) are either: (a) stored in PRO regions of memory and encoded as protected entries, or (b) stored in read-only regions of memory. Note that this is not necessarily require the page table walk through those walked stage-1 translation table entries to actually be performed on every access to the memory region associated with the stage-2 translation table entry having the anti-aliasing property. It is possible that information could be cached in the TLB 29 to indicate whether the anti-aliasing check is passed (or to indicate for certain walked stage-1 translation table entries whether they have already been determined to be stored in a PRO region and/or be a protected entry), to avoid needing to perform the full translation table walk every time.

Figure 16:
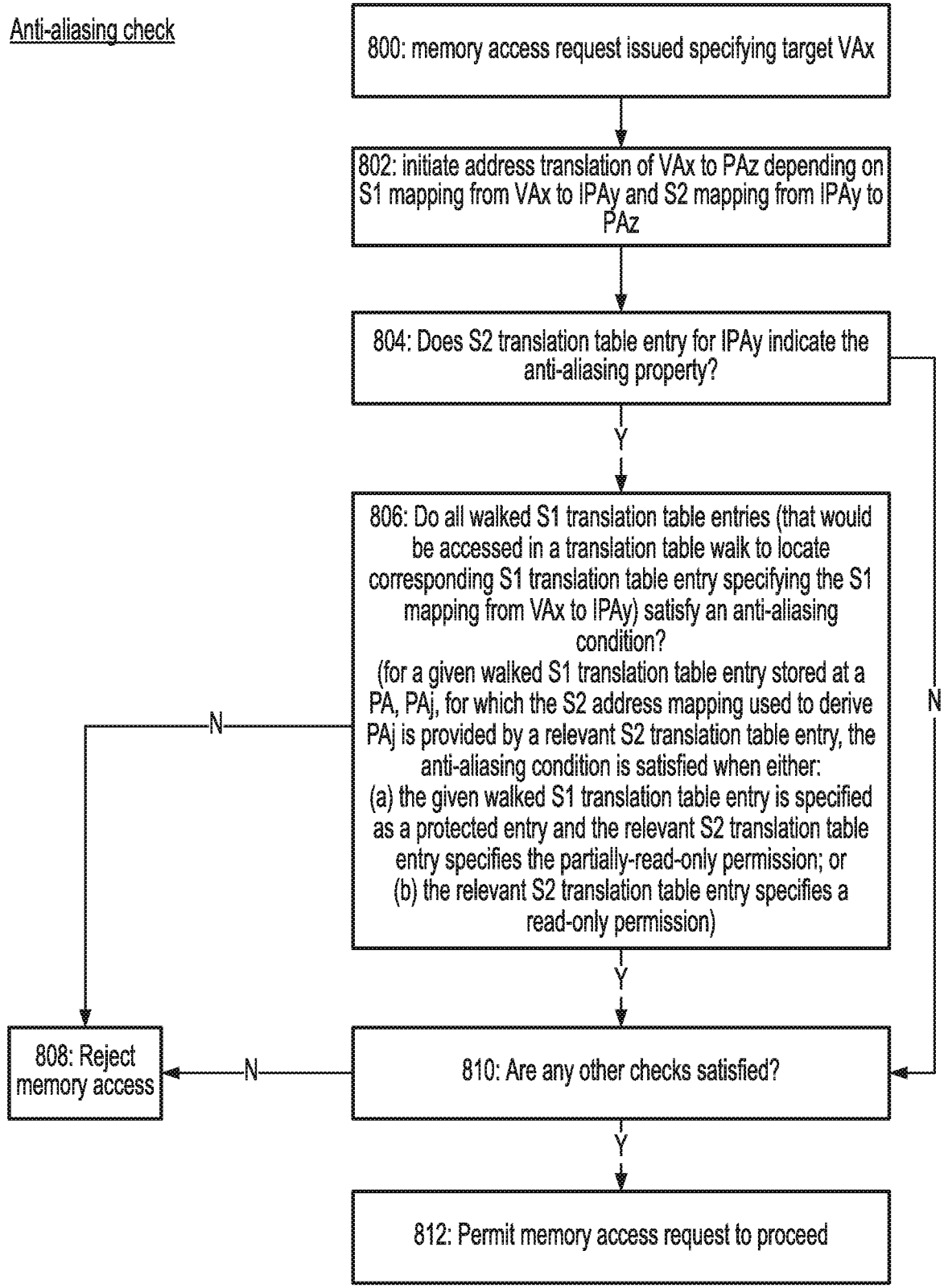
FIG. 16 illustrates an anti-aliasing check.

FIG. 16 is a flow diagram showing a method of performing the anti-aliasing check. At step 800 a memory access request is issued specifying a certain target virtual address VAx. At step 802 the MMU 28 initiates the address translation from the target virtual address VAx to the target physical address PAz, depending on a stage-1 mapping from VAx to an intermediate address IPAy and a stage-2 mapping from intermediate address IPAy to the target physical address PAz (it is not essential to perform two separate actions for stage-1 and stage-2 translation—while that is one option, other examples could have a combined stage-1-and-2 TLB which can map directly from VAx to PAz for translations which have already been cached, but on a miss in the TLB the new VA-to-PA mapping is identified by performing the stage-1 and stage-2 walks as shown in FIG. 6).

At step 804 the MMU 28 checks whether the stage-2 translation table entry (Block or Page descriptor) corresponding to IPAy indicates the anti-aliasing property. If so, then at step 806 the MMU checks whether all walked stage-1 translation table entries satisfy an anti-aliasing condition. The walked stage-1 translation table entries are the entries that would, if a full translation table walk corresponding to virtual address VAx was performed, be accessed in a translation table walk to locate the corresponding S1 translation table entry specifying the S1 address mapping from VAx to IPAy (the walk may not actually be required for the current memory access, depending on what is already cached in TLBs 29). For example, in FIG. 6 the walked stage-1 translation table entries would be the entries marked D_Table in the L0, L1 and L2 stage-1 page tables, and the entry marked D_Page in the L3 stage-1 page table. The anti-aliasing condition is satisfied for a given walked stage-1 translation table entry when either of the following conditions is satisfied:

(a) the given walked stage-1 translation table entry is specified as a protected entry, and the given walked stage-1 translation table entry is stored at a physical address, PAj, for which the PRO permission is specified by the relevant stage-2 translation table entry which provides the stage-2 address mapping used to derive PAj; or (b) a read-only permission is specified by the relevant stage-2 translation table entry providing the stage-2 address mapping used to derive the physical address PAj of the given walked stage-1 translation table entry.

For the specific example of FIG. 6, the relevant stage-2 translation table entry for the L1 stage-1 entry used to derive the PA of the accessed page would be the stage-2 L3 entry indicated as "0_Page" in FIG. 6. For the other walked stage-1 entries shown in FIG. 6, there would similarly be relevant stage-2 L3 entries (or stage-2 L1 or L2 entries if a stage-2 Block descriptor is found corresponding to IPAy) that should be marked with the PRO or read-only permission in order for the anti-aliasing condition to be satisfied (these are the entries at the end of the various stage-2 translation walks shown for obtaining the physical addresses of each walked stage-1 translation table).

If at step 806 of FIG. 16 the MMU 28 determines that any one or more of the walked stage-1 translation table entry does not satisfy the anti-aliasing condition, then at step 808 the memory access is rejected. A fault can be signalled, which can trigger an exception handler (e.g. executing at EL2) to perform an error handling action.

Step 808 is omitted if all the walked stage-1 translation table entries satisfy the anti-aliasing condition. In this case, at step 810 the MMU 28 also checks whether any other checks are satisfied (such as any checks based on the PRO permission being set for the access to memory region, the protected-entry checks if the memory access request is issued in response to an RCW instruction, or any other specific checks for protecting against other inappropriate accesses, such as a check based on the secure/non-secure state in implementations which support this). If any of the other checks are not satisfied then again at step 808 the memory access is rejected (the fault type generated may depend on the cause of the access check failure). Otherwise at step 812 the memory access request is permitted to proceed.

Hence, as shown in FIG. 6, the anti-aliasing property can be set in the stage-2 translation table entry which provides the physical address mapping for the memory region being accessed (this could be either a Page descriptor or a Block descriptor). If the anti-aliasing property is set then for valid accesses to the corresponding memory location, this will require all the walked stage-1 translation table entries on the path to the entry providing the intermediate address mapping for that memory region to either (a) be marked as protected and for the stage-2 entry providing the physical address mappings of the regions storing those walked stage-1 translation table entries to specify the PRO permission, or (b) be stored at a PA for which a read-only permission is specified by the stage-2 entry providing the PA mapping for that PA. This means that an attacker cannot easily set up a new aliasing stage-1 address mapping to circumvent the protections applied for the trusted address mapping expected to be used to access the corresponding region of memory. An attacker able to influence the behaviour of operating system code at EL1 will not have control over the stage-2 entries used to control memory access because this will be based on the base address in the VTTBR_EL2 register which cannot be updated by code executing at EL1 (so cannot cause the PRO or read-only permissions to become set for the regions storing the attacker's newly created aliasing stage-1 address mappings). Also, the attacker is not able to cause stage-1 entries to become protected since the mechanism for code executing at EL1 to update stage-1 translation table entry may be to execute the protected-entry-checking type of RCW instruction discussed above (other instructions being prohibited from writing to the PRO regions of memory), and that instruction is not able to change the protected status of any translation table entry. Also, read-only regions cannot be written to by any write instruction. Therefore, any new entry which the attacker is able to create should fail at least one of the anti-aliasing checks of whether the stage-1 entries used to obtain the VA-IPA mapping are protected and whether those entries are stored in PRO or read-only regions of memory.

Protection Against Inappropriate Updates to Stage-1 Top-Level Base Address

Another attack which might be attempted by an attacker able to influence the behaviour of operating system code executing at EL1 could be to modify the stage-1 top-level base address (identifying the location in memory of the L0 stage-1 page table) indicated by the base address register TTBR_EL1. For example, the attacker could substitute an address of a new set of stage-1 tables defined by the attacker, to replace the address of the authorised page table structure which is correctly formed and behaves correctly as verified by the hypervisor. Also, the attacker could try to force the MMU 28 to use the existing authorised stage-1 page tables in an unexpected way, for example by substituting the base address of one of the L1, 2 or 3 page tables to replace the correct L0 base address, so that next-level table pointers or address mappings for a different memory region may incorrectly be used for a memory region being accessed, due to the table accessed being used at the wrong level of the tree from the expected level so that different bits of the virtual address are used to select the relevant entry from the table.

Figure 17:
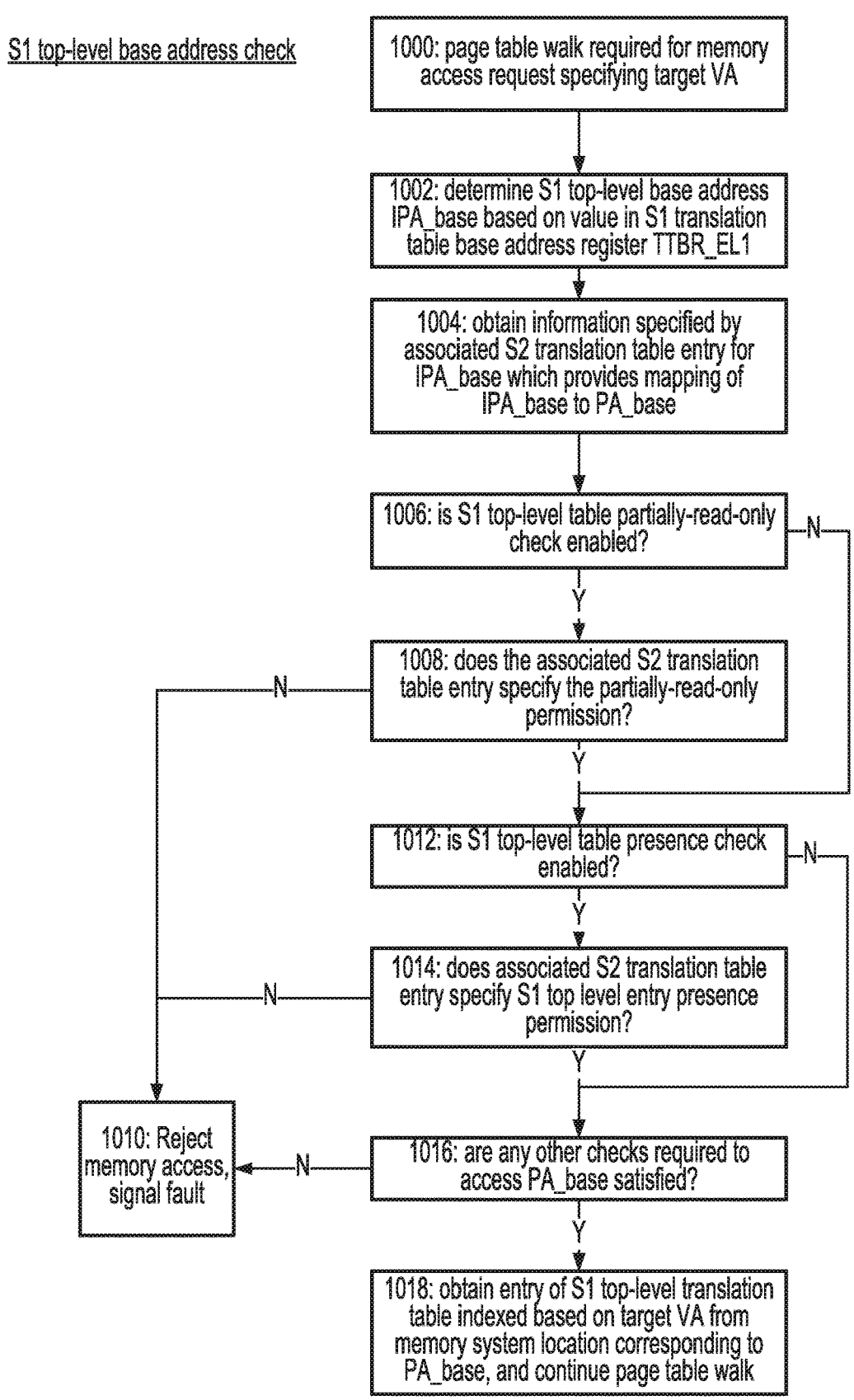
FIG. 17 illustrates a stage-1 top-level table presence check and a stage-1 top-level partially-read-only check.

FIG. 17 illustrates stage-1 top-level base address checks which can be performed to protect against these types of attacks. At step 1000 a page table walk is required for a memory access request specifying a certain target virtual address (for memory access requests which do not require a page table walk because the required address mappings are already available from the TLB, then any required stage-1 top-level base address check would already have been done at the time when those address mappings were allocated to the cache following an earlier page table walk, and so it is not necessary to carry out another check). At step 1002, the stage-1 top-level base address is determined based on the value in the stage-1 translation table base address register TTBR_EL1. The base address is specified as an intermediate address, IPA_base. At step 1004 the MMU 28 obtains information specified by the associated stage-2 translation table entry which provides the mapping from IPA_base to PA_base. For example, this information could be obtained from the TLB 29 if already cached in the TLB, or could be obtained by performing a stage-2 translation table walk using the stage-2 base address specified in the stage-2 translation table base address register VTTBR_EL2.

At step 1006, the MMU 28 determines whether a stage-1 top-level table partially-read-only check is enabled. For example, this may be determined based on a stage-1 top-level table partially-read-only check enable control value stored in a control register (e.g. the stage-2 translation control register VTCR_EL2 for which updates are restricted to code executing at exception level EL2 or higher). Alternatively, other implementations may consider the stage-1 top-level table partially-read-only check to be permanently enabled. If the stage-1 top-level table partially-read-only check is enabled, then at step 1008 the MMU 28 checks whether the associated stage-2 translation table entry specifies the PRO permission, and if not then at step 1010 the memory access is rejected and a fault is signalled. This means that if the attacker tries to modify the stage-1 translation table base address register TTBR_EL1 to point to a new L0 page table created by the attacker, accesses based on the modified base address will fail because the attacker will not have been able to modify the PRO regions of memory and so must have written to a non-PRO region, so the stage-1 top-level table PRO check will fail.

If the stage-1 top-level table PRO check is either disabled at step 1006, or is enabled but passes at step 1008, then at step 1012 the MMU 28 determines whether a stage-1 top-level table presence check is enabled. Again, this could be determined based on a stage-1 top-level table presence check enable control value stored in a control register (e.g. the stage-2 translation control register VTCR_EL2). The enable control value used to determine whether the check is enabled at step 1012 could be the same as the enable control value mentioned above for step 1006 (e.g. in some implementations, the checks at steps 1008 and 1014 could be regarded as two steps of a single check that is either enabled as a whole or disabled as a whole). If the stage-1 top-level table presence check is enabled then at step 1014 the MMU 28 determines whether the associated stage-2 translation table entry specifies the stage-1 top-level entry presence permission 80. As mentioned above with respect FIG. 8, the stage-1 top-level entry presence permission could be encoded as an alternative variant of the PRO permission (so that memory regions having the stage-1 top-level entry presence permission are also assumed to have the PRO permission), or could alternatively be encoded as an independent attribute separate from an indication of whether the PRO permission is provided. If the associated stage-2 translation table entry does not specify the stage-1 top-level entry presence permission then again at step 1010 the memory access is rejected and a fault is signalled. This can be used to protect against a valid and authentic L1, L2 or L3 table being substituted for the L0 table by modifying the stage-1 top-level base address to point to the address of the L1, L2 or L3 table, since the stage-2 entries corresponding to memory regions used to hold the L1, L2 or L3 tables may be defined not to have the stage-1 top-level entry presence permission. Only the memory regions used to hold any valid and authentic stage-1 L0 tables can be marked in the corresponding stage-2 entries as having the stage-1 top-level entry presence permission, to restrict which addresses can be used as the stage-1 L0 base address for a valid memory access.

If the stage-1 top-level table presence check is either disabled at step 1012 or enabled but passes at step 1014, then at step 1016 the MMU carries out any other checks required to access the memory region identified by PA_base, and if these fail again rejects the memory access at step 1010. If any other checks are passed, then at step 1018 the stage-1 top-level base address IPA_base can validly be used to perform a page table walk. Hence, an address of a stage-1 top-level translation table entry is obtained by applying an index offset to the determined PA_base, with the index offset determined based on a subset of bits of the target VA to be translated. The page table walk then continues as discussed earlier.

Hence, as shown in FIG. 6, in the expected usage defined by software (so not enforced as a requirement by the hardware), among the stage-1 entries accessed on a page table walk to obtain the PA mapping 64 for a memory region for which added protection is desired, the stage-2 Page/Block descriptor which provides the PA mapping 64 identifying the storage location of the stage-1 L0 page table specifies both the PRO and stage-1 top-level presence permissions, and the stage-2 Page/Block descriptors which provide the PA mapping 64 identify the storage location of the stage-1 L1, L2 or L3 page tables specify the PRO permission but do not specify the stage-1 top-level presence permission. This protects against the base address substitution attacks described above. An alternative avoiding the need to implement base-address checks could be to trap any accesses to the stage-1 base address register TTBR_EL1 to the hypervisor executing at EL2, which could then examine whether the update requested by operating system code executing at EL1 is valid and reject the update if necessary. However, in practice the operating system may frequently need to switch the address in the base address register TTBR_EL1 on context switches, and so trapping every update may be costly in terms of performance. By implementing the stage-1 top-level base address check shown in FIG. 17 this can avoid the need for such traps on base address register updates to TTBR_EL1, to improve performance.

In some examples, a single variant of the stage-1 top-level presence permission can be supported, in which case the check at step 1014 of FIG. 17 can simply be a check of whether that stage-1 top-level presence permission has been specified.

Other examples may support more than one variant of the stage-1 top-level presence permission to allow finer control over which particular stage-1 translation table base address registers can specify an address in the corresponding memory region. For example, some implementations may support two stage-1 base address registers:

TTBR0_EL1, selected for stage-1 translations in EL0 or EL1 when a configurable number (N) of most significant bits of the virtual address to be translated are all set to 0 (N can be defined in a control value specified in a control register); and TTBR1_EL1, selected for stage-1 translations in EL0 or EL1 when any of the N most significant bits of the virtual address to be translated is non-zero.

Several variants of the stage-1 top-level presence permission can then be defined including:

Toplevel0: indicates a memory region allowed to be used for a Top-level translation table accessed via TTBR0_EL1 but not a top-level translation table accessed via TTBR1_EL1;

Toplevel1: indicates a memory region allowed to be used for a Top-level translation table accessed via TTBR1_EL1 but not a top-level translation table accessed via TTBR0_EL1;

Toplevel01: indicates a memory region allowed to be used for a top-level translation table accessed via either TTBR0_EL1 or TTBR1_EL1.

In this case, one implementation of the check at step 1014 may cause the fault to be signalled at step 1010 of FIG. 17, if either of the following conditions are satisfied:

TTBR0_EL1 is used to provide a base address for which the corresponding memory region does not have either the Toplevel0 or Toplevel01 permission; or TTBR1_EL1 is used to provide a base address for which the corresponding memory region does not have either the Toplevel1 or Toplevel01 permission.

In some implementations, further controls, set in a control register controlled by software at EL2, can control whether TTBR0_EL1 is prohibited from giving access to a Toplevel1 page, and whether TTBR1_EL1 is prohibited from giving access to a Toplevel0 page. In this case, the check at step 1014 may cause the fault to be signalled at step 1010 if either of the following conditions are satisfied:

- TTBR0_EL1 is used to provide a base address for which the corresponding memory region does not have the Toplevel01 permission or has the Toplevel1 permission when the TTBR0/Toplevel1 fault enable control is set to enable faults to be triggered when TTBR0_EL1 is used to access a Toplevel1 page; or
- TTBR1_EL1 is used to provide a base address for which the corresponding memory region does not have the Toplevel01 permission or has the Toplevel0 permission when the TTBR1/Toplevel0 fault enable control is set to enable faults to be triggered when TTBR1_EL1 is used to access a Toplevel0 page.

These features allow more fine-grained control over which memory address regions can be used to provide the top-level stage-1 translation table, but the enable controls allow these more fine-grained checks to be disabled if it is considered acceptable for any Toplevel page to be used to provide base addresses for both TTBR0 and TTBR1.

In some implementations, the encoding of the various top-level presence permissions Toplevel0, Toplevel1, Toplevel01 can be combined with the encoding of the PRO permission, so that these are treated as Toplevel0 PRO permission, a Toplevel1 PRO permission and a Toplevel01 PRO permission. In such an implementation it would not be possible to define a Toplevel0, Toplevel1, or Toplevel01 memory region as not having the PRO permission. Nevertheless, it is possible to define a PRO region as not having any of the Toplevel0, Toplevel1, or Toplevel01 permissions as there is a separate PRO permission encoding which is not treated as having any of the stage-1 top-level table presence permissions.

Simulator Example

Figure 18:
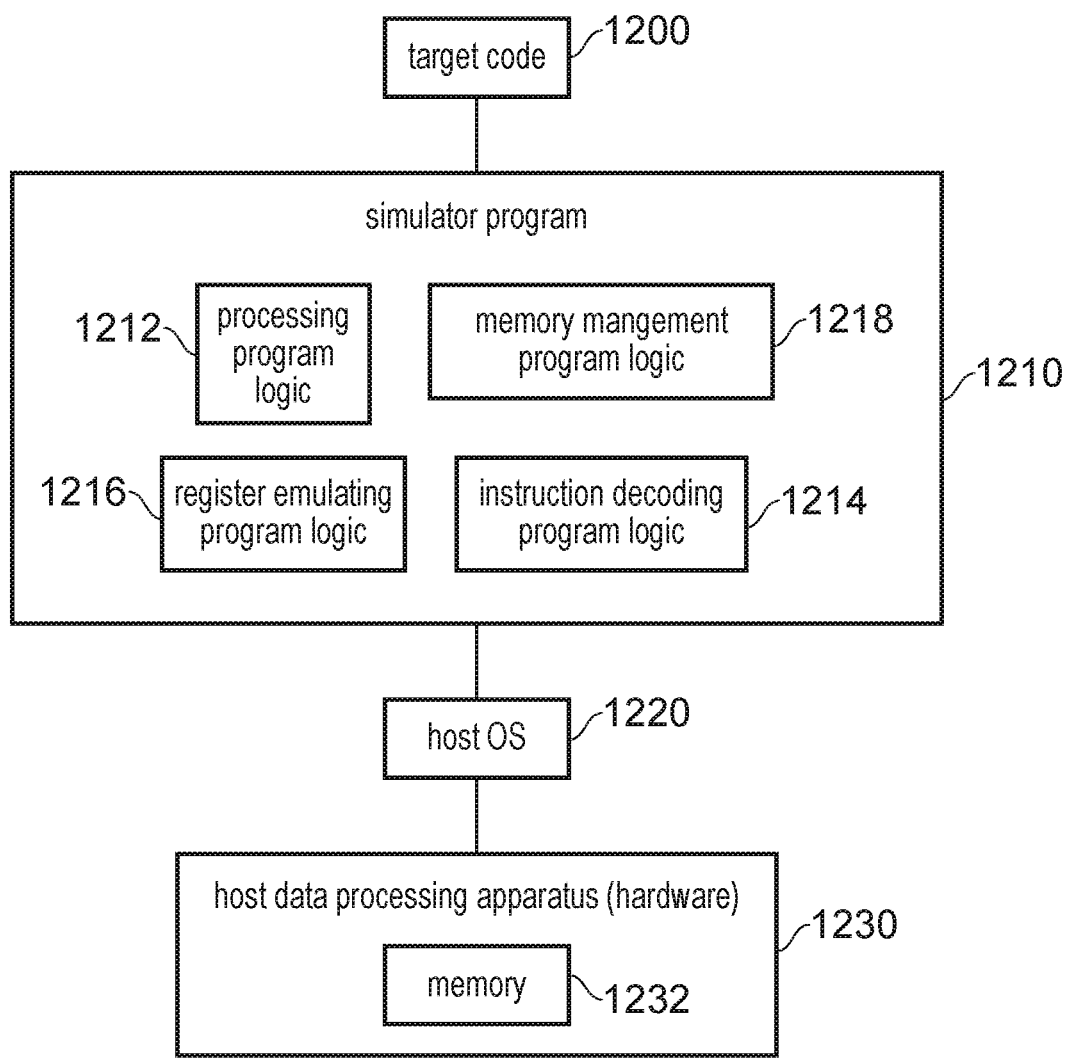
FIG. 18 illustrates a simulator implementation that may be used.

FIG. 18 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1230, optionally running a host operating system 1220, supporting the simulator program 1210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1230), some simulated embodiments may make use of the host hardware, where suitable.

The simulator program 1210 may be stored on a computer-readable storage medium (which may be a non-transitory medium), and provides a program interface (instruction execution environment) to the target code 1200 (which may include applications, operating systems and a hypervisor) which is the same as the interface of the hardware architecture being modelled by the simulator program 1210. Thus, the program instructions of the target code 1200, including the protected-entry-checking RCW instructions described above, may be executed from within the instruction execution environment using the simulator program 1210, so that a host computer 1230 which does not actually have the hardware features of the apparatus 2 discussed above can emulate these features. Similarly, the various memory management checking functions as discussed above, including support for PRO region types, may be emulated using memory management program logic 1218 of the simulator program 1210.

Hence, the simulator program 1210 may have processing program logic 1212 which simulates the state of the processing circuitry 4 described above. For example the processing program logic 1212 may control transitions of execution state EL0-EL3 in response to events occurring during simulated execution of the target code 1200. Instruction decoding program logic 1214 decodes instructions of the target code 1200 and maps these to corresponding sets of instructions in the native instruction set of the host apparatus 1230. The register emulating program logic 1216 maps register accesses requested by the target code to accesses to corresponding data structures maintained on the host hardware of the host apparatus 1230, such as by accessing data in registers or memory 1232 of the host apparatus 1230. Memory management program logic 1218 implements address translation, page table walks and access control checking in a corresponding way to the MMU 28 described in the hardware-implemented embodiment above, but also has the additional function of mapping the simulated physical addresses, obtained by the stage-2 mapping in the address translation based on the page tables defined for the target code 1200, to host virtual addresses used to access host memory 1232. These host virtual addresses may themselves be translated into host physical addresses using the standard address translation mechanisms supported by the host (the translation of host virtual addresses to host physical addresses being outside the scope of what is controlled by the simulator program 1210).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
    processing circuitry to process instructions in one of a plurality of execution states associated with different levels of privilege; and
    memory management circuitry to translate a target virtual address specified by a memory access request into a target physical address indicative of a memory system location to be accessed in response to the memory access request; in which:
    the memory management circuitry is configured to support two-stage address translation based on a stage-1 translation table structure comprising stage-1 translation table entries and a stage-2 translation table structure comprising stage-2 translation table entries, where a mapping from the target virtual address to the target physical address depends on a stage-1 address mapping and a stage-2 address mapping, the stage-1 address mapping comprising a mapping from the target virtual address to a target intermediate address specified by a corresponding stage-1 translation table entry corresponding to the target virtual address, and the stage-2 address mapping comprising a mapping from the target intermediate address to the target physical address specified by a corresponding stage-2 translation table entry corresponding to the target intermediate address;
    the memory management circuitry is configured to perform permission checking for the memory access request based at least on stage-2 access permission information specified by the corresponding stage-2 translation table entry, the stage-2 access permission information having an encoding specifying whether a memory region corresponding to the target intermediate address has a partially-read-only permission indicating that write requests to the memory region corresponding to the target intermediate address, issued when the processing circuitry is in a predetermined execution state of the plurality of execution states, are permitted for a restricted subset of write request types but prohibited for write request types other than the restricted subset, the restricted subset of write request types comprising a metadata-updating write request generated by the memory management circuitry to update access tracking metadata in translation table entries; and
    the memory management circuitry is configured to reject the memory access request in response to determining that the memory access request is a write request issued in the predetermined execution state, the stage-2 access permission information specifies that the memory region corresponding to the target intermediate address has the partially-read-only permission, and the memory access request is a write request type other than the restricted subset of write request types.

2. The apparatus according to claim 1, in which the restricted subset of write requests types also comprises a write request issued in response to at least one predetermined type of translation table entry updating instruction executed by the processing circuitry in the predetermined execution state.

3. The apparatus according to claim 1, in which the restricted subset of write request types excludes a write request issued in response to at least one type of store instruction executed by the processing circuitry in the predetermined execution state.

4. The apparatus according to claim 1, in which each stage-1 translation table entry has an encoding specifying whether that stage-1 translation table entry is a protected entry for which updates are restricted in comparison to stage-1 translation table entries not encoded as a protected entry.

5. The apparatus according to claim 4, comprising protected-entry-checking circuitry to check whether to restrict an update to access permissions or address mappings specified by a given stage-1 translation table entry, based on whether the given stage-1 translation table entry is marked as a protected entry.

6. The apparatus according to claim 5, in which a given stage-2 access translation table entry corresponding to a given intermediate address has an encoding specifying whether the memory region corresponding to the given intermediate address has an anti-aliasing property indicative of a requirement that, for an access to the memory region corresponding to the given intermediate address to be allowed, each of one or more walked stage-1 translation table entries that would be accessed in a translation table walk of the stage-1 translation structure to locate the corresponding stage-1 translation table entry specifying the stage-1 address mapping from a given virtual address to the given intermediate address are required to satisfy an anti-aliasing condition,
    the anti-aliasing condition for a given walked stage-1 translation table entry being satisfied when either:
        the given walked stage-1 translation table entry is specified as a protected entry and the partially-read-only permission is specified by the stage-2 access permission information for a relevant stage-2 translation table entry which provides the stage-2 address mapping used to derive a physical address of the memory system location storing the given walked stage-1 translation table entry; or
        a read-only permission is specified by the stage-2 access permission information for the relevant stage-2 translation table entry;
    and
    the memory management circuitry is configured to reject the memory access request in response to determining that the corresponding stage-2 translation table entry specifies that the memory region corresponding to the target intermediate address has the antialiasing property and that any of the one or more walked stage-1 translation table entries fails to satisfy the anti-aliasing condition.

7. The apparatus according to claim 4, comprising protected-entry-checking circuitry responsive to the processing circuitry executing a protected-entry-checking type of read-check-write instruction for requesting an update to a given memory system location, to:
    read data from the given memory system location,
    check whether the data read from the given memory system location has a value consistent with a stage-1 translation table entry specified as a protected entry, and in response to determining that the data read from the given memory system location has a value consistent with a stage-1 translation table entry specified as a protected entry, prevent an update-restricted subset of bits of the stage-1 translation table entry from being updated in response to the read-check-write instruction.

8. The apparatus according to claim 7, in which when the update to the given memory system location is performed in response to the protected-entry-checking type of read-check-write instruction, the protected-entry-checking circuitry is configured to control the read of the data from the given memory system location, the check of whether the data has a value consistent with a stage-1 translation table entry specified as a protected entry, and the update of the given memory system location to be performed as an atomic operation.

9. The apparatus according to claim 7, in which when the update to the given memory system location is performed in response to the protected-entry-checking type of read-check-write instruction executed when the processing circuitry is in the predetermined execution state, the protected-entry-checking circuitry is configured to prohibit the update to the given memory system location from changing whether a stage-1 translation table entry stored at the given memory system location is specified as a protected entry.

10. The apparatus according to claim 7, in which a write request issued in response to the protected-entry-checking type of read-check-write instruction is one of said restricted subset of write request types.

11. The apparatus according to claim 7, in which the update-restricted subset of bits comprises one of:
all bits of the stage-1 translation table entry; or
a proper subset of bits of the stage-1 translation table entry, including one or more bits used to encode whether the stage-1 translation table entry is specified as a protected entry, the selection of which bits are in said proper subset of bits being one of:
a non-programmable; or
programmable, depending on a software-programmable selection value stored in a control register.

12. The apparatus according to claim 7 in which:
each valid stage-1 translation table entry has the encoding specifying whether that stage-1 translation table entry is a protected entry; and
in response to determining that the data read from the given memory system location has a value consistent with an invalid stage-1 translation table entry, the protected-entry-checking circuitry is configured to permit updates of the invalid stage-1 translation table entry other than an update which causes the data at the given memory system location to become a valid stage-1 translation table entry specified as a protected entry.

13. The apparatus according to claim 7, in which both valid and invalid stage-1 translation table entries have an encoding specifying whether that stage-1 translation table entry is a protected entry;
in response to determining that the data read from the given memory system has a value consistent with an invalid stage-1 translation table entry specified as a protected entry, the protected-entry-checking circuitry is configured to prevent an invalid-entry-update-restricted subset of bits of the given memory system location from being updated in response to the read-check-write instruction; and
in response to determining that the data read from the given memory system has a value consistent with a valid stage-1 translation table entry specified as a protected entry, the protected-entry-checking circuitry is configured to prevent a valid-entry-update-restricted subset of bits of the given memory system location from being updated in response to the read-check-write instruction.

14. The apparatus according to claim 13, in which:
a valid stage-1 translation table entry comprises a first bitfield indicating whether that valid stage-1 translation table entry is a protected entry; and
an invalid stage-1 translation table entry comprises a second bitfield indicating whether that invalid stage-1 translation table entry is a protected entry; and
the first bitfield and the second bitfield are at different bit positions within a stage-1 translation table entry encoding.

15. The apparatus according to claim 7, in which the protected-entry-checking circuitry is configured to suppress the update of the update-restricted subset of bits by one of:
rejecting the update of the given memory system location when the requested update would cause an update to at least one of the update-restricted subset of bits; or
when the update-restricted subset of bits is a proper subset of bits of the given memory system location, suppressing the update of the update-restricted subset of bits while allowing an update of at least one other bit of the given memory system location in response to the read-check-write instruction.

16. The apparatus according to claim 7, in which in response to the protected-entry-checking type of read-check-write instruction, the processing circuitry is configured to set at least one condition status value to indicate whether at least part of the update requested by the protected-entry-checking type of read-check-write instruction was suppressed based on the check of whether the data read from the given memory system is a stage-1 translation table entry specified as a protected entry.

17. The apparatus according to claim 7, in which the protected-entry checking type of read-check-write instruction is one of:
a swap variant of the protected-entry-checking type of read-check-write instruction, in response to which the processing circuitry is configured to write the data read from the given memory system location to a destination register for use as an operand by a subsequent instruction;
a store variant of the protected-entry-checking type of read-check-write instruction, for which the processing circuitry is configured to process the store variant without writing the data read from the given memory system location to a destination register;
a compare-and-swap variant of the protected-entry-checking type of read-check-write instruction specifying a compare operand, for which the protected-entry-checking circuitry is configured to determine whether a comparison of the data read from the given memory system location and the compare operand satisfies a comparison condition, suppress the update to the given memory system location when the comparison condition is unsatisfied, and write the data read from the given memory system location to a destination register for use as an operand by a subsequent instruction; or
a bit set/clear instruction for which the update of the given memory system location comprises setting or clearing at least one selected bit of the data at the given memory system location.

18. The apparatus according to claim 1, in which the memory management circuitry is configured to determine a stage-1 top-level base address of a stage-1 top-level translation table of the stage-1 translation table structure based on a value in a stage-1 translation table base address register.

19. The apparatus according to claim 18, in which when a stage-1 top-level table partially-read-only check is enabled, the memory management circuitry is configured to signal a fault in response to determining that the stage-1 top-level base address corresponds to an intermediate address for which an associated stage-2 translation table entry does not specify the partially-read-only permission.

20. The apparatus according to claim 19, in which the memory management circuitry is configured to determine whether the stage-1 top-level table partially-read-only check is enabled based on a stage-1 top-level partially-read-only check enable control value stored in a control register.

21. The apparatus according to claim 18, in which: when a stage-1 top-level table presence permission check is enabled, the memory management circuitry is configured to determine whether a given memory region corresponding to the stage-1 top-level base address is associated with a stage-1 top-level table presence permission indicating that the given memory region is allowed to be allocated for storing the stage-1 top-level table of the stage-1 translation table structure, and to trigger a fault when the given memory region corresponding to the stage-1 top-level base address does not have the stage-1 top-level table presence permission.

22. The apparatus according to claim 21, in which the memory management circuitry is configured to determine whether the given memory region is associated with the stage-1 top level table presence permission based on an encoding of an associated stage-2 translation table entry corresponding to the stage-1 top-level base address.

23. The apparatus according to claim 21, in which the memory management circuitry is configured to determine whether the stage-1 top-level table presence permission check is enabled based on a stage-1 top-level table presence permission check enable control value stored in a control register.

24. A method comprising:
processing instructions in one of a plurality of execution states associated with different levels of privilege; and
performing two-stage address translation of a target virtual address specified by a memory access request into a target physical address indicative of a memory system location to be accessed in response to the memory access request, the two-stage address translation based on a stage-1 translation table structure comprising stage-1 translation table entries and a stage-2 translation table structure comprising stage-2 translation table entries, where a mapping from the target virtual address to the target physical address depends on a stage-1 address mapping and a stage-2 address mapping, the stage-1 address mapping comprising a mapping from the target virtual address to a target intermediate address specified by a corresponding stage-1 translation table entry corresponding to the target virtual address, and the stage-2 address mapping comprising a mapping from the target intermediate address to the target physical address specified by a corresponding stage-2 translation table entry corresponding to the target intermediate address;
performing permission checking for the memory access request based at least on stage-2 access permission information specified by the corresponding stage-2 translation table entry, the stage-2 access permission information having an encoding specifying whether a memory region corresponding to the target intermediate address has a partially-read-only permission indicating that write requests to the memory region corresponding to the target intermediate address, issued when the processing circuitry is in a predetermined execution state of the plurality of execution states, are permitted for a restricted subset of write request types but prohibited for write request types other than the restricted subset, the restricted subset of write request types comprising a metadata-updating write request generated by memory management circuitry to update access tracking metadata in translation table entries; and
rejecting the memory access request in response to determining that the memory access request is a write request issued in the predetermined execution state, the stage-2 access permission information specifies that the memory region corresponding to the target intermediate address has the partially-read-only permission, and the memory access request is a write request type other than the restricted subset of write request types.

25. A non-transitory computer-readable medium storing a computer program comprising instructions for controlling a host data processing apparatus to provide an instruction execution environment for executing target code, the computer program comprising:
processing program logic to simulate processing of instructions of the target code in one of a plurality of execution states associated with different levels of privilege; and
memory management program logic to translate a target virtual address specified by a simulated memory access request triggered by the target code into a target physical address indicative of a simulated memory system location to be accessed in response to the memory access request; in which:
the memory management program logic is configured to support two-stage address translation based on a stage-1 translation table structure comprising stage-1 translation table entries and a stage-2 translation table structure comprising stage-2 translation table entries, where a mapping from the target virtual address to the target physical address depends on a stage-1 address mapping and a stage-2 address mapping, the stage-1 address mapping comprising a mapping from the target virtual address to a target intermediate address specified by a corresponding stage-1 translation table entry corresponding to the target virtual address, and the stage-2 address mapping comprising a mapping from the target intermediate address to the target physical address specified by a corresponding stage-2 translation table entry corresponding to the target intermediate address;
the memory management program logic is configured to perform permission checking for the simulated memory access request based at least on stage-2 access permission information specified by the corresponding stage-2 translation table entry, the stage-2 access permission information having an encoding specifying whether a memory region corresponding to the target intermediate address has a partially-read-only permission indicating that write requests to the memory region corresponding to the target intermediate address, issued when the processing program logic is in a predetermined execution state of the plurality of execution states, are permitted for a restricted subset of write request types but prohibited for write request types other than the restricted subset, the restricted subset of write request types comprising a metadata-updating write request generated by the memory management program logic to update access tracking metadata in translation table entries; and the memory management program logic is configured to reject the simulated memory access request in response to determining that the simulated memory access request is a write request issued in the predetermined execution state, the stage-2 access permission information specifies that the memory region corresponding to the target intermediate address has the partially-read-only permission, and the simulated memory access request is a write request type other than the restricted subset of write request types.

* * * * *